United States Patent
DiLiberto et al.

(10) Patent No.: US 10,279,978 B2
(45) Date of Patent: May 7, 2019

(54) MULTI-COMPARTMENT CONTAINER WITH FRANGIBLE SEAL AND VAPOR PERMEABLE REGION

(71) Applicants: David DiLiberto, Rochester, NY (US); Frank Colombo, Rochester, NY (US)

(72) Inventors: David DiLiberto, Rochester, NY (US); Frank Colombo, Rochester, NY (US)

(73) Assignee: David DiLiberto, Rochester, NY (US)

( * ) Notice: Subject to any disclaimer, the term of this patent is extended or adjusted under 35 U.S.C. 154(b) by 0 days.

(21) Appl. No.: 14/872,592

(22) Filed: Oct. 1, 2015

(65) Prior Publication Data

US 2016/0023834 A1     Jan. 28, 2016

Related U.S. Application Data

(63) Continuation of application No. 13/749,370, filed on Jan. 24, 2013, which is a continuation-in-part of
(Continued)

(51) Int. Cl.
| | |
|---|---|
| *B65D 81/32* | (2006.01) |
| *A61J 1/20* | (2006.01) |
| *B65D 75/56* | (2006.01) |
| *B65D 33/08* | (2006.01) |
| *B65D 33/10* | (2006.01) |

(Continued)

(52) U.S. Cl.
CPC ........ *B65D 81/3266* (2013.01); *A61J 1/2093* (2013.01); *B65D 81/3272* (2013.01); *A61J 1/10* (2013.01); *A61J 1/1475* (2013.01); *B65D 33/08* (2013.01); *B65D 33/10* (2013.01); *B65D 75/30* (2013.01); *B65D 75/566* (2013.01);
(Continued)

(58) Field of Classification Search
CPC ..... B65D 81/3266; B65D 25/08; A61J 1/2093
USPC ........... 220/367.1, 203.27, 203.29; 215/211, 215/307; 206/219
See application file for complete search history.

(56) References Cited

U.S. PATENT DOCUMENTS

| | | |
|---|---|---|
| 2,157,169 A | 5/1939 | Foster |
| 2,880,898 A | 4/1959 | Navikas |

(Continued)

FOREIGN PATENT DOCUMENTS

| | | |
|---|---|---|
| EP | 1036742 | 9/2000 |
| EP | 1693043 | 8/2006 |

(Continued)

OTHER PUBLICATIONS

CN 201180029792.X—An Unofficial Chinese Office Action (With Partial Translation) dated Jan. 21, 2014 for Chinese patent Application No. CN201180029792.X Filed Jun. 16, 2011, Published Feb. 27, 2013 as CN102947196A; Corresponding to U.S. Appl. No. 13/160,712; Inventor: David DiLiberto, et al.
(Continued)

*Primary Examiner* — Anthony D Stashick
*Assistant Examiner* — Mollie Impink
(74) *Attorney, Agent, or Firm* — Duane C. Basch; Basch & Nickerson LLP

(57) ABSTRACT

Disclosed is a multi-compartment container including features that permit the rupture or opening of a seal between compartments to enable mixing of the materials within each compartment, as well as a vapor permeable region to permit vapor to escape after mixing.

20 Claims, 34 Drawing Sheets

Related U.S. Application Data application No. 13/160,712, filed on Jun. 15, 2011, now Pat. No. 8,915,359.

(60) Provisional application No. 61/590,364, filed on Jan. 25, 2012, provisional application No. 61/355,600, filed on Jun. 17, 2010.

(51) Int. Cl.

| | |
|---|---|
| C09K 5/18 | (2006.01) |
| A61J 1/14 | (2006.01) |
| B65D 75/30 | (2006.01) |
| B65D 75/58 | (2006.01) |
| A61J 1/10 | (2006.01) |
| B65D 81/24 | (2006.01) |

(52) U.S. Cl.
CPC ........ *B65D 75/5883* (2013.01); *B65D 81/245* (2013.01); *C09K 5/18* (2013.01)

(56) References Cited

U.S. PATENT DOCUMENTS

| | | | |
|---|---|---|---|
| 2,885,104 A | 5/1959 | Greenspan | |
| 2,916,197 A | 12/1959 | Detrie et al. | |
| 3,085,681 A | 4/1963 | Fazzari | |
| 3,156,352 A | 11/1964 | Hayhurst | |
| 3,343,664 A | 9/1967 | Poitras | |
| 3,380,646 A | 4/1968 | Doyen et al. | |
| 3,429,429 A | 2/1969 | Poitras | |
| 3,608,709 A | 9/1971 | Pike | |
| 3,722,377 A | 3/1973 | Hayes | |
| 3,743,520 A | 7/1973 | Croner | |
| 3,744,625 A | 7/1973 | Chin | |
| 3,755,389 A | 8/1973 | Blaney | |
| 3,756,389 A | 9/1973 | Firth | |
| 3,809,224 A | 5/1974 | Greeenwood | |
| 3,983,994 A | 10/1976 | Wyslotsky | |
| 4,057,047 A | 11/1977 | Gossett | |
| 4,233,325 A | 11/1980 | Slangan et al. | |
| 4,235,332 A | 11/1980 | Andersen et al. | |
| 4,264,007 A | 4/1981 | Hunt | |
| 4,268,272 A * | 5/1981 | Taura ...................... A47J 36/28 | |
| | | | 126/204 |
| 4,458,811 A | 7/1984 | Wilkinson | |
| 4,462,224 A | 7/1984 | Dunshee et al. | |
| 4,509,642 A | 4/1985 | Rowell | |
| 4,519,499 A | 5/1985 | Stone et al. | |
| 4,596,713 A | 6/1986 | Burdette | |
| 4,602,910 A | 7/1986 | Larkin | |
| 4,608,043 A | 8/1986 | Larkin | |
| 4,632,244 A | 12/1986 | Landau | |
| 4,961,495 A * | 10/1990 | Yoshida ................... B29C 65/76 | |
| | | | 206/219 |
| 4,998,666 A | 3/1991 | Ewan | |
| 5,114,004 A | 5/1992 | Isono et al. | |
| 5,246,142 A | 9/1993 | DiPalma et al. | |
| 5,287,961 A | 2/1994 | Herran | |
| 5,394,980 A | 3/1995 | Tsai | |
| 5,423,421 A | 6/1995 | Inoue et al. | |
| 5,465,707 A | 11/1995 | Fulcher et al. | |
| 5,492,219 A | 2/1996 | Stupar | |
| 5,577,369 A | 11/1996 | Becker et al. | |
| 5,836,445 A | 11/1998 | Provonchee | |
| 5,853,689 A | 12/1998 | Klatte | |
| 5,885,635 A | 3/1999 | Spring et al. | |
| 5,944,709 A | 8/1999 | Barney et al. | |
| 5,967,308 A | 10/1999 | Bowen | |
| 5,989,608 A * | 11/1999 | Mizuno ................. A21D 10/02 | |
| | | | 219/735 |
| 6,017,598 A | 1/2000 | Kreischer et al. | |
| 6,036,004 A | 3/2000 | Bowen | |
| 6,059,709 A | 5/2000 | Achelpohl et al. | |
| 6,068,898 A | 5/2000 | Oyama | |
| 6,086,609 A | 7/2000 | Buckley | |
| 6,165,161 A | 12/2000 | York et al. | |
| 6,174,508 B1 | 1/2001 | Klatte | |
| 6,186,998 B1 | 2/2001 | Inuzuka et al. | |
| 6,203,535 B1 | 3/2001 | Barney et al. | |
| 6,289,889 B1 | 9/2001 | Bell et al. | |
| 6,506,092 B1 | 4/2003 | Kuracina et al. | |
| 6,578,572 B2 | 6/2003 | Tischer et al. | |
| 6,635,077 B2 * | 10/2003 | Grissmeyer ........ B65D 81/3266 | |
| | | | 126/263.07 |
| 6,743,451 B2 | 6/2004 | Rasile et al. | |
| 6,758,572 B2 | 7/2004 | Ladyjensky | |
| 6,833,170 B1 | 12/2004 | Knoerzer et al. | |
| 6,846,305 B2 | 1/2005 | Smith et al. | |
| 6,866,145 B2 | 3/2005 | Richards et al. | |
| 6,935,492 B1 | 8/2005 | Loeb | |
| 6,968,952 B2 | 11/2005 | Crevier et al. | |
| 6,996,951 B2 | 2/2006 | Smith et al. | |
| 7,055,683 B2 | 6/2006 | Bourque et al. | |
| 7,169,138 B2 | 1/2007 | Becker et al. | |
| 7,175,164 B2 | 2/2007 | Gollier et al. | |
| 7,175,614 B2 | 2/2007 | Gollier et al. | |
| 7,240,796 B2 * | 7/2007 | Murray .............. B65D 51/1644 | |
| | | | 137/246 |
| 7,243,788 B2 * | 7/2007 | Schmidt ............ B65D 81/3266 | |
| | | | 206/219 |
| 7,255,506 B2 | 8/2007 | Gruenbacher et al. | |
| 7,306,095 B1 | 12/2007 | Bourque et al. | |
| 7,419,300 B2 | 9/2008 | Pawlowski et al. | |
| 7,438,428 B2 | 10/2008 | Schrimmer et al. | |
| 7,575,384 B2 | 8/2009 | Bauer et al. | |
| 7,582,340 B2 | 9/2009 | Hagino | |
| 7,618,406 B2 | 11/2009 | Roger | |
| 7,628,939 B2 | 12/2009 | Solsberg | |
| 7,658,279 B2 * | 2/2010 | Oka ...................... A61J 1/2093 | |
| | | | 206/219 |
| 7,794,485 B2 | 9/2010 | Caceres et al. | |
| 7,922,984 B2 * | 4/2011 | Hamilton .................. A61L 2/20 | |
| | | | 134/6 |
| 9,334,098 B1 * | 5/2016 | Hughes ............ B65D 81/3266 | |
| 2002/0066678 A1 | 6/2002 | Sharon et al. | |
| 2002/0166779 A1 | 11/2002 | Etesse et al. | |
| 2003/0047467 A1 | 3/2003 | Smith et al. | |
| 2003/0116452 A1 | 6/2003 | Saric et al. | |
| 2004/0045842 A1 | 3/2004 | Matusuda et al. | |
| 2004/0065315 A1 * | 4/2004 | Fish ........................ A61F 7/03 | |
| | | | 126/263.08 |
| 2005/0224388 A1 | 10/2005 | Saric et al. | |
| 2005/0281487 A1 | 12/2005 | Pawloski et al. | |
| 2006/0005827 A1 | 1/2006 | Consoli et al. | |
| 2006/0093765 A1 | 5/2006 | Mueller | |
| 2006/0196784 A1 | 9/2006 | Murray | |
| 2007/0029001 A1 | 2/2007 | Trouilly et al. | |
| 2007/0278114 A1 | 12/2007 | Kane et al. | |
| 2008/0002918 A1 | 1/2008 | Steele | |
| 2008/0138474 A1 * | 6/2008 | Murray ................ B65D 77/225 | |
| | | | 426/118 |
| 2008/0276645 A1 * | 11/2008 | Murray ................ B65B 43/465 | |
| | | | 62/530 |
| 2009/0178945 A1 | 7/2009 | Moehlenbrock et al. | |
| 2009/0238495 A1 | 9/2009 | Anderson | |
| 2009/0266735 A1 | 10/2009 | Moore | |
| 2011/0308977 A1 | 12/2011 | DiLiberto et al. | |
| 2012/0180777 A1 | 7/2012 | Young | |

FOREIGN PATENT DOCUMENTS

| | | |
|---|---|---|
| WO | WO9507665 | 3/1995 |
| WO | WO-9526177 | 10/1995 |
| WO | WO03092574 | 11/2003 |
| WO | WO2011159873 | 12/2011 |

OTHER PUBLICATIONS

KR10-2013-7001176—An Unofficial Korean Office Action (With English Translation) dated March 25, 2014 for Korean Patent Application 10-2013-7001176 Filed Jun. 16, 2011; Corresponding to U.S. Appl. No. 13/160,712; Inventor: David DiLiberto, et al.

(56) References Cited

OTHER PUBLICATIONS

An International Search Report and Written Opinion for PCT Patent Application PCT/US2011/040653 Filed Jun. 16, 2011, Published Dec. 22, 2011, as WO 2011/159873; Inventor: David DiLiberto et al., Corresponds to U.S. Appl. No. 13/160,712.

PCT/US2013/023056 an Unofficial an International Search Report and Written Opinion dated Mar. 22, 2013 for PCT/US2013/023056 Filed Jan. 25, 2013, Corresponds to U.S. Appl. No. 13/749,370; Inventor: David DiLiberto et al. Mar. 22, 2013.

PCT/US2013/023056-An International Search Report and Written Opinion dated Aug. 7, 2014 for PCT/US2013/023056 filed Jan. 25, 2013; Inventor David DiLiberto et al.

U.S. Appl. No. 13/749,370—Co-Pending US Patent Application filed Jan. 24, 2013.

U.S. Appl. No. 13/160,712—Co-Pending US Patent Application filed June 15, 2011.

EP 11796419.7-1708/2582593/PCT/US2011/040653 an unofficial European Search Report dated Jul. 23, 2015.

EP13741420.7 Unofficial extended European Search Report and Search Opinion dated Jan. 15, 2016, corresponds to U.S. Appl. No. 14/872,592; Inventor DiLiberto et al.

\* cited by examiner

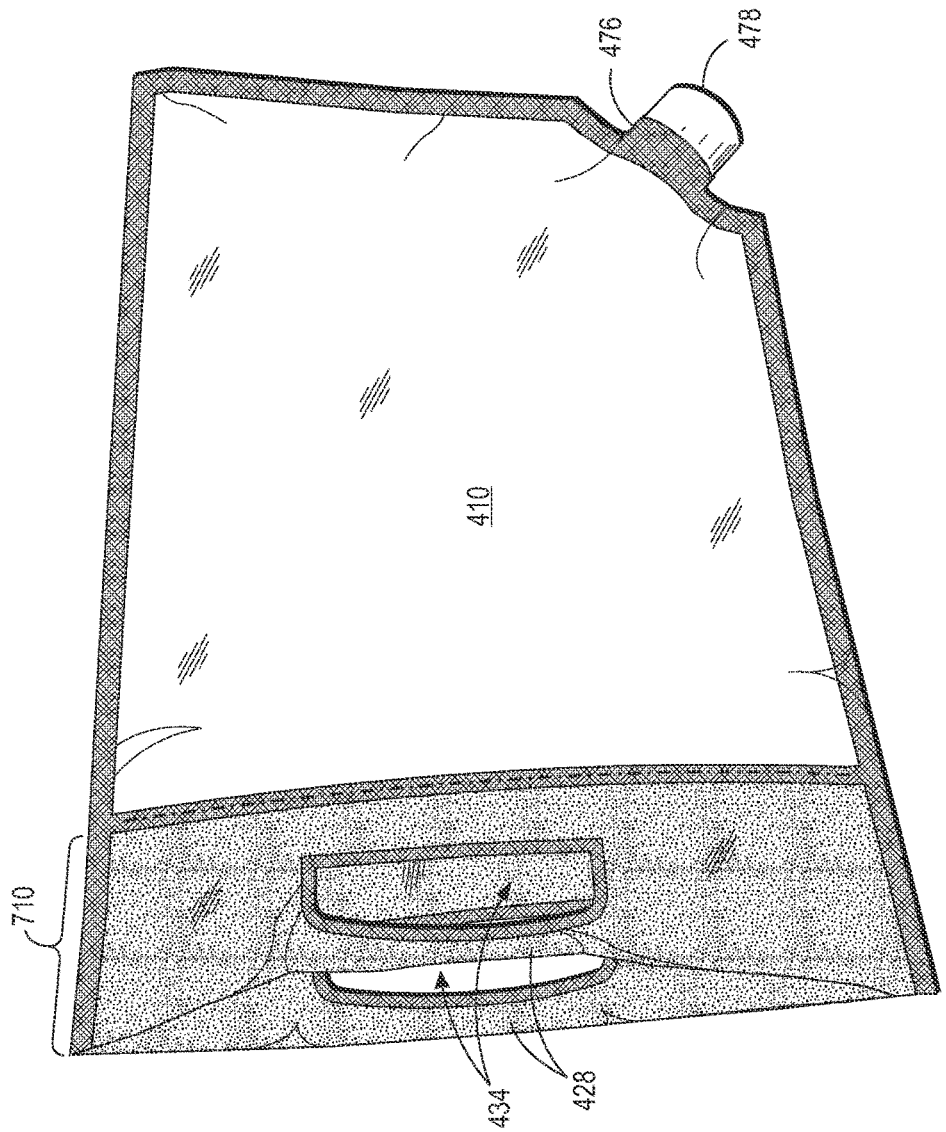

MULTI-COMPARTMENT CONTAINER WITH FRANGIBLE SEAL AND VAPOR PERMEABLE REGION

This application is a continuation of, and claims priority from, the following applications: U.S. patent application Ser. No. 13/749,370, for a "MULTI-COMPARTMENT CONTAINER WITH FRANGIBLE SEAL AND EXTERNAL MEANS FOR APPLYING OPENING FORCE BETWEEN COMPARTMENTS," filed Jan. 24, 2013 by David DiLiberto et al., which claimed priority from U.S. Provisional Patent Application 61/590,364, for a "CONTAINER HAVING A PACKET THEREIN WITH A PEELABLE SEAL," filed Jan. 25, 2012 by David DiLiberto; and which was a continuation-in-part of U.S. patent application Ser. No. 13/160,712 (now U.S. Pat. No. 8,915,359), for a "CONTAINER HAVING A TEARABLE PACKET THEREIN," filed Jun. 15, 2011 by David DiLiberto et al., which claimed priority from U.S. Provisional Patent Application 61/355,600, for a "CONTAINER HAVING A FRANGIBLE PACKET THEREIN," filed Jun. 17, 2010 by David DiLiberto et al.; all of which are hereby incorporated by reference in their entirety.

A collapsible, multi-compartment, container having a flexible pouch or compartment and an adjacent compartment or packet that may be joined or connected to the pouch is disclosed. Various embodiments are described, including an outer pouch including an inner packet therein with an aperture or opening covered by a peel-able or otherwise removable seal. More particularly, the inner packet is connected, possibly via a link to the outer pouch in a manner such that displacement of a surface of the outer pouch applies a stress to the inner packet and provides for a rupturing or tearing of the inner packet, and release of the material therein to be mixed with the material in the outer pouch. In another embodiment, the pouch includes a plurality of compartments, at least two of the compartments are separated by a frangible seal, where the seal may be broken and the contents of the adjacent compartment contents mixed by the application of an opposing force applied through pull tabs, at least one of which further serves as a handle for the pouch.

BACKGROUND AND SUMMARY

Various devices and methods are known for the dispersion of one material into another at the time of use within a self-contained container (e.g., cold compress packs). Multi-part containers of this type are useful for the separate storage of ingredients or materials for a variety of products, where at least one ingredient can be stored separately for a period of time, and when admixed with a second material within another part of the container, will produce a desired mixture. The materials must generally be maintained separately until shortly before use to avoid a propensity to degrade in quality over a relatively short period of time, or to permit the safe shipment and storage of one material and subsequent addition of the second material and safe mixing. Once such example is the shipment and/or storage of 2-cycle oil in a container compartment, and subsequent addition of gasoline into a second compartment before the compartments are opened relative to one another for mixing and then use in a 2-cycle engine.

Where such mixtures are consumables, they are generally stored and sold in an isolated format and the components of the mixture remain segregated during storage and then are mixed just before use. Mixture at the time of use is beneficial because the combined solution fails to retain its initially mixed qualities over time. Such products usually, but not necessarily, comprise at least one ingredient and at least one additional ingredient which may be in the form of a liquid, dry granules or powder.

One example of a product is a protein-based beverage, where the protein-containing component is produced and stored separate from a beverage component and the two are mixed just prior to the time of consumption. Given the desirability of mixing beverage components or other foodstuffs just prior to use the disclosed embodiment provides a package for separately storing components in a single package, where the components may be stored in an integrated compartment(s) or packet(s), one of which may be ruptured or otherwise opened by applying a force to a removable or frangible seal to permit the components therein to mix just prior to consumption. This type of container is advantageous since it facilitates the shipment, storage and sale of such products as discrete ingredients, extending shelf life of the product, as well as effectiveness by avoiding premature mixing. Moreover, having the components in separate compartments of a single flexible pouch permits the pouch to serve as both a mixing and dispensing container, thereby assuring admixture of the materials in the proper proportions while eliminating the potential of unintended mixing or spoilage.

The embodiments disclosed provide a beverage pouch that internally stores and then mixes an additive, such as a flavoring agent, seasoning, alcohol, medication or some other beverage enhancing ingredient into an associated material. However, the disclosed containers can also be used for all kinds of food packaging including liquids (e.g., beverages, salad dressings, sauces or similar food enhancements, etc.) and semiliquid products (e.g., yogurt, cereal, ice cream, etc.).

It is further contemplated that tearing or pealing back of a sealing member of the inner packet, and intermixing of the two components, may be initiated by applying force(s) with the hands or other mechanical means at different portions of the exterior of the container. Various embodiments may be used for applying a force to the package, to cause the rupture of a seal or separation between the components. One particular embodiment employs one or more handles operatively associated with the container to both apply the force necessary to rupture or unseal at least one of the compartments, where the handles may further be used to carry the container before and/or after the components have been mixed. Yet other alternative embodiments employ various spouts, fitments and the like as apertures to facilitate use of the container for various applications as will be described in further detail herein.

Multi-compartment containers or packs are known for use with instant hot/cold packets, preparation of amalgams in dentistry, reconstituting infusion medicine and chemi-luminescent devices. Notably there are few, if any, offerings of multi-compartment packages within the food and beverage or consumable market, presumably due to the inability to economically construct and fill packaging that would satisfy the criteria for mixing components only at or just prior to the time of use. The apparent difficulty centers around a requirement to maintain an impervious separation of the components until a time when the consumer wishes to combine the components in a mixture. In order to overcome this limitation the disclosed embodiments provide a package that includes an inner compartment or packet, whereby an applied pressure releases the contents of the packet for mixture with the surrounding material contained within the pouch.

As described in U.S. Pat. No. 4,057,047 for a thermal pack, a heat seal may be arranged to allow an interior packet to burst in response to an externally applied force by squeezing the contents of the partitioned pouch. However, this force also has the potential of rupturing the outer pouch and thereby allowing the contents to leak out. Thus, the very nature of a squeezing-dependent rupture concept, when applied to a pouch that also has a peripheral heat seal that forms the container, must be controlled in order to have reliable inner packet rupture along with a burst resistant outer pouch.

Disclosed in embodiments herein is a multi-compartment, flexible container, comprising: a first compartment suitable for receiving a material therein prior to being completely sealed; a second compartment suitable for receiving a material therein, wherein at least a portion of the second compartment is adjacent the first compartment (sharing a common border), wherein an adjacent portion of the container between the first and second compartments includes a separable (including peelable, frangible, partable) seal to prevent intermixing between the first and second compartments; and at least two external tabs (ears, handles, etc.) operatively associated with the container, said tabs being suitable for applying an opposing force to the seal and separating the seal (without applying internal or excess pressure in either compartment), wherein at least one of said external tabs also serving as a handle suitable for carrying the container Also disclosed herein is a method of preparing a multi-compartment container, comprising: orienting at least a top and a bottom layer of flexible material in a coplanar fashion; adhering the top and bottom layers to one another to create a first compartment suitable for receiving a material therein prior to being completely sealed; adhering the top and bottom layers to one another to create a second compartment suitable for receiving a material therein, wherein at least a portion of the second compartment is adjacent a portion of the first compartment and where the adjacent portion includes a continuous yet separable seal between the adjacent portions of the compartments; and providing external handles, operatively associated with at least the outer surfaces of the top and bottom layers, said handle suitable for carrying the container as well as applying a sufficient opposing force to at least a region of the separable seal to separate the seal along the adjacent portions of the first and second compartments.

Another embodiment disclosed herein is a multi-compartment, container, comprising: a first compartment suitable for receiving a material therein prior to being completely sealed; a second compartment suitable for receiving a material therein, wherein at least a portion of the second compartment is adjacent the first compartment, wherein an adjacent portion of the container between the first and second compartments includes a separable seal to prevent intermixing between the first and second compartments; a third compartment, substantially enclosed within at least one of said first compartment and said second compartment, wherein said third compartment is operatively connected to an anchor point on said container, wherein a force applied to said anchor point causes the opening of the third compartment; and at least two external tabs operatively associated with the container, said tabs being suitable for applying an opposing force to the seal and separating the seal.

Further disclosed herein is a multi-compartment container, comprising: an outer flexible pouch formed from a flexible, liquid-impervious material; an inner packet, substantially enclosed within said outer flexible pouch, wherein said inner packet contains at least one substance for mixing with a material contained within the outer flexible pouch; and said inner packet being operatively connected (by a tether or tab) to an anchor point on said outer flexible pouch, wherein a force applied to said anchor point causes the opening of the inner packet and thereby permits mixing of the substance in the inner packet with the material in the outer flexible pouch without direct access to the inner packet.

Yet another embodiment disclosed herein is a method for use of a multi-compartment container, said container comprising an outer flexible pouch having a first material therein along with an inner packet having a second material stored within said packet, said inner packet having a sealable opening therein, and a link between a surface of said inner packet and a surface of said outer pouch, said link covering the sealable opening of the inner packet, said method of use including: storing a first material in the outer flexible pouch; storing a second material in the inner packet; and applying a force to a surface of the outer pouch to create a tensile force along at least a portion of the surface of the inner packet, said tensile force being of sufficient magnitude to cause the peeling of the link away from the inner packet to expose the opening therein and enabling a combination of the second material with the first material, the combination being retained within the outer pouch.

Other and further objects, features and advantages of the disclosed containers and methods will be evident from a reading of the following specification and by reference to the accompanying drawings forming a part thereof, wherein the examples of the presently preferred embodiments are given for the purposes of disclosure.

BRIEF DESCRIPTION OF THE DRAWINGS

The disclosed embodiments will be more fully understood and further advantages will become apparent when reference is had to the following detailed description and the accompanying drawings, in which:

FIG. 42 is an illustration of an alternative embodiment of a container including lobes along one or more edges of the container.

Figure 1:
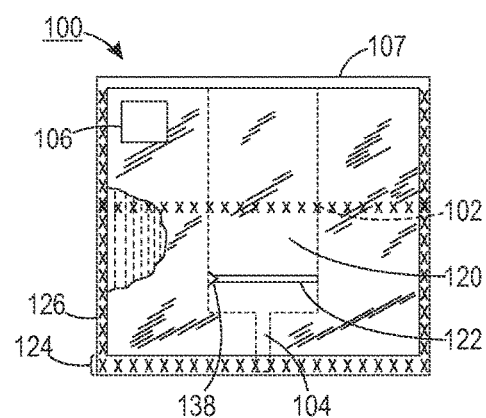
FIG. 1 illustrates a front view of a pouch container having a packet therein.

The various embodiments described herein are not intended to limit the disclosure to those embodiments described. On the contrary, the intent is to cover all alternatives, modifications, and equivalents as may be included within the spirit and scope of the disclosure.

DETAILED DESCRIPTION

For a general understanding, reference is made to the drawings. In the drawings like references have been used throughout to designate identical or equivalent elements. It is also noted that the drawings may not have been drawn to scale and that certain regions may have been purposely drawn disproportionately so that the features and concepts could be properly illustrated.

As used herein the term "pouch" will be understood to reference a bag-like container. In the multi-compartment container embodiments described herein, pouch-like structures may be employed for one or more of the various compartments. To facilitate the following discussion, the term pouch has generally been employed to refer to an outer flexible container whereas the term packet is generally used to refer to an internal envelope like compartment holding an additive.

The term compartment has also been employed and is understood to include pouches and packets as described herein, as well as other formed partitions, recesses and regions. It is also understood that a plurality of packets may be provided inside a single outer pouch although the depicted embodiments only include a single interior compartment. However, it is further understood that such terms are not to be considered mutually exclusive or limiting in that terms such as pouch, packet, container, carton, box, envelope and others are expressions that similarly describe the concept of a flexible compartment or container.

As used herein the terms "frangible", "tearable" or "separable" are used to describe a characteristic of the packet, a seal, or separation between compartments of a container, as a structure or material that is capable of being pulled or separated into pieces, perhaps destructively, in order to come apart or open the packet(s)/compartment(s) to expose its contents. In one embodiment disclosed herein the seal may be between layers of sealed surfaces, and the separation thereof includes the rupture or re-opening thereof.

Although the term flexible has been employed throughout, it will be understood that the level of manner of flexibility may be achieved through not only the selection of materials for the container or package itself, but may also be a function of the materials retained therein. Thus, although the term flexible is employed, the disclosure is intended to include semi-flexible and semi-rigid materials provided that such materials permit the features and functionality disclosed relative to at least one embodiment herein. Moreover, different materials may be employed for different components of the disclosed containers, resulting in a combination of materials having various ranges of flexibility. For example, a semi-rigid material may be employed within or attached to the disclosed containers in order to permit the container to "stand" when displayed or used (e.g., once the contents are mixed for consumption the container becomes a bowl from which food can be eaten).

Packet/Compartment within a Pouch

FIGS. 1-7 and 12-22 provide various illustrations of exemplary embodiments that may be generally characterized as packet or compartment within a pouch containers. Referring to FIGS. 1-6 and 15-22, for example, the multi-compartment container embodiments depicted include a first or outer pouch 238 formed from a flexible material, and possibly including an expansion region such as a pleated bottom 212 on the pouch. Although it is likely that the outer pouch will be made from a flexible plastic or polymeric, liquid-impervious material, various alternatives discussed below contemplate the use of other materials as well. A second compartment, such as an inner packet 102 within the pouch, includes a stress riser or sealed opening. Attached to or near the sealed opening is a force (e.g., tension) transmission link or member that may be pulled, via the outer pouch surface, to cause the second compartment to rupture or at least have a separable seal opened. The force transmission link is, in one embodiment, attached to and between the packet, at a position adjacent to a stress riser or sealed opening and an anchor point on the outer wall of the pouch. Although generally depicted in a top-to-bottom configuration, it will be appreciated that there may be a number of arrangements of the inner packet 102 and force transmission link to permit grasping the outer pouch and/or associated ears, handles, tabs and the like. For example, the force may be applied directly across (side-to-side) or diagonally across (corner-to-corner) the container. The application of a pulling or tensile force, at a position on or near the anchor point, causes the transfer of the tensile force, via the aforementioned connection link, to the packet in order to promote opening of the packet to expose its contents. Although the amount of force required to open the compartment or seal may depend upon the particular application, forces in the range of about 0.01 and up to about 25 pounds are contemplated, and higher-strength materials and seals (greater than 25 pound rupture force) are contemplated in industrial applications.

Figure 7:
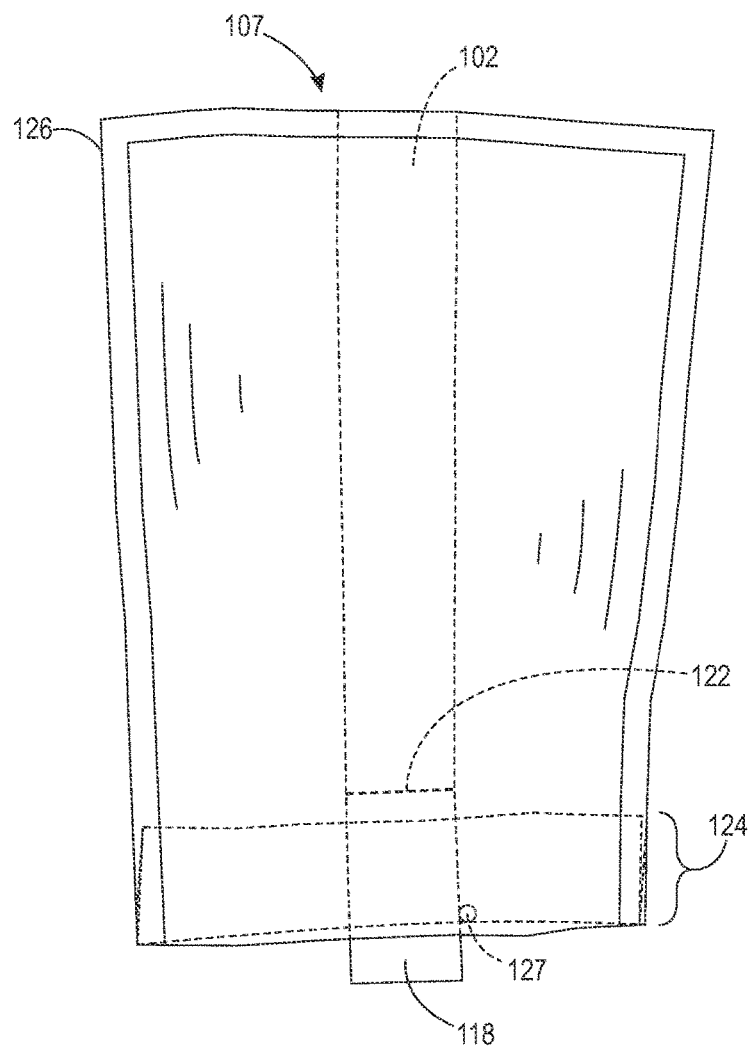
FIG. 7 is a front view of an alternative pouch embodiment with a full-length packet therein.
Figure 21:
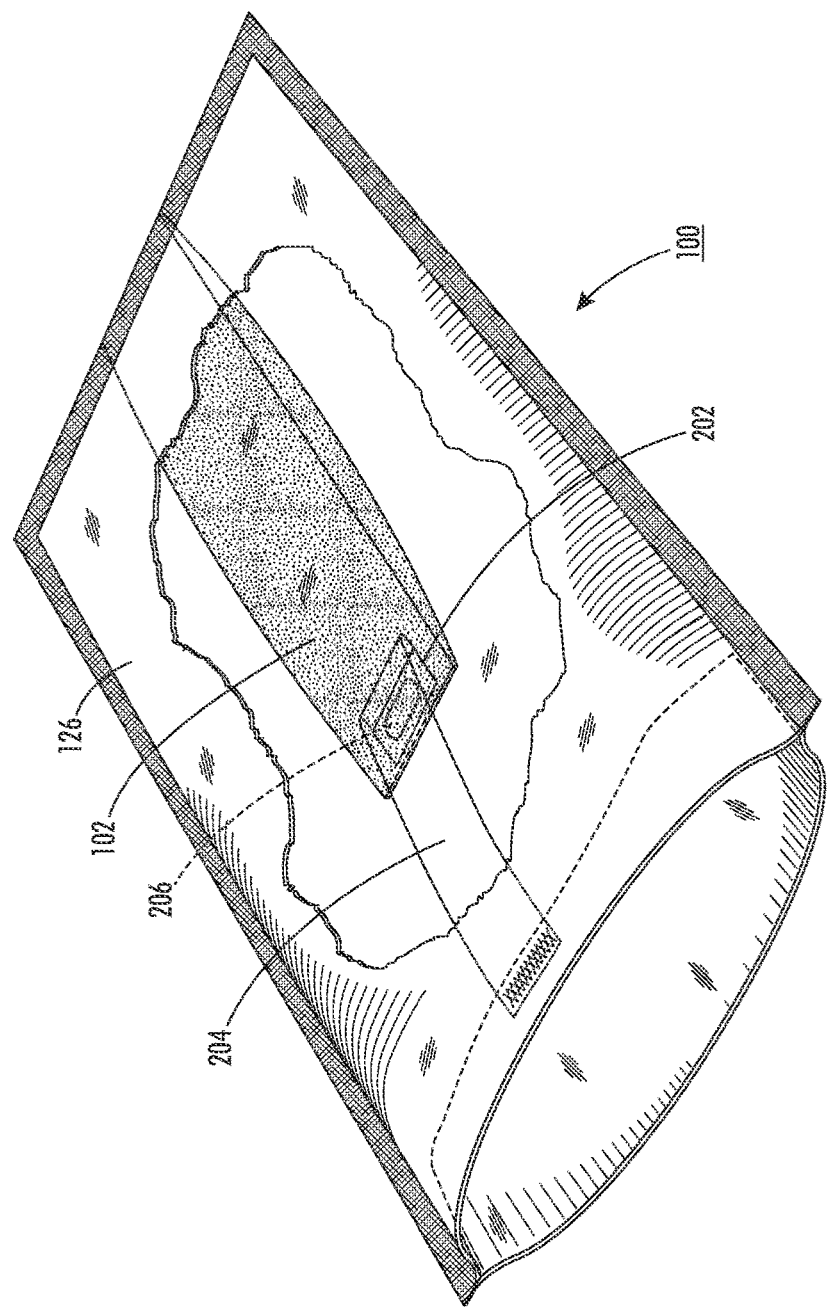
FIGS. 21 and 22 are respective illustrations of an alternative embodiment of the container with a sealed and unsealed inner packet.
Figure 25:
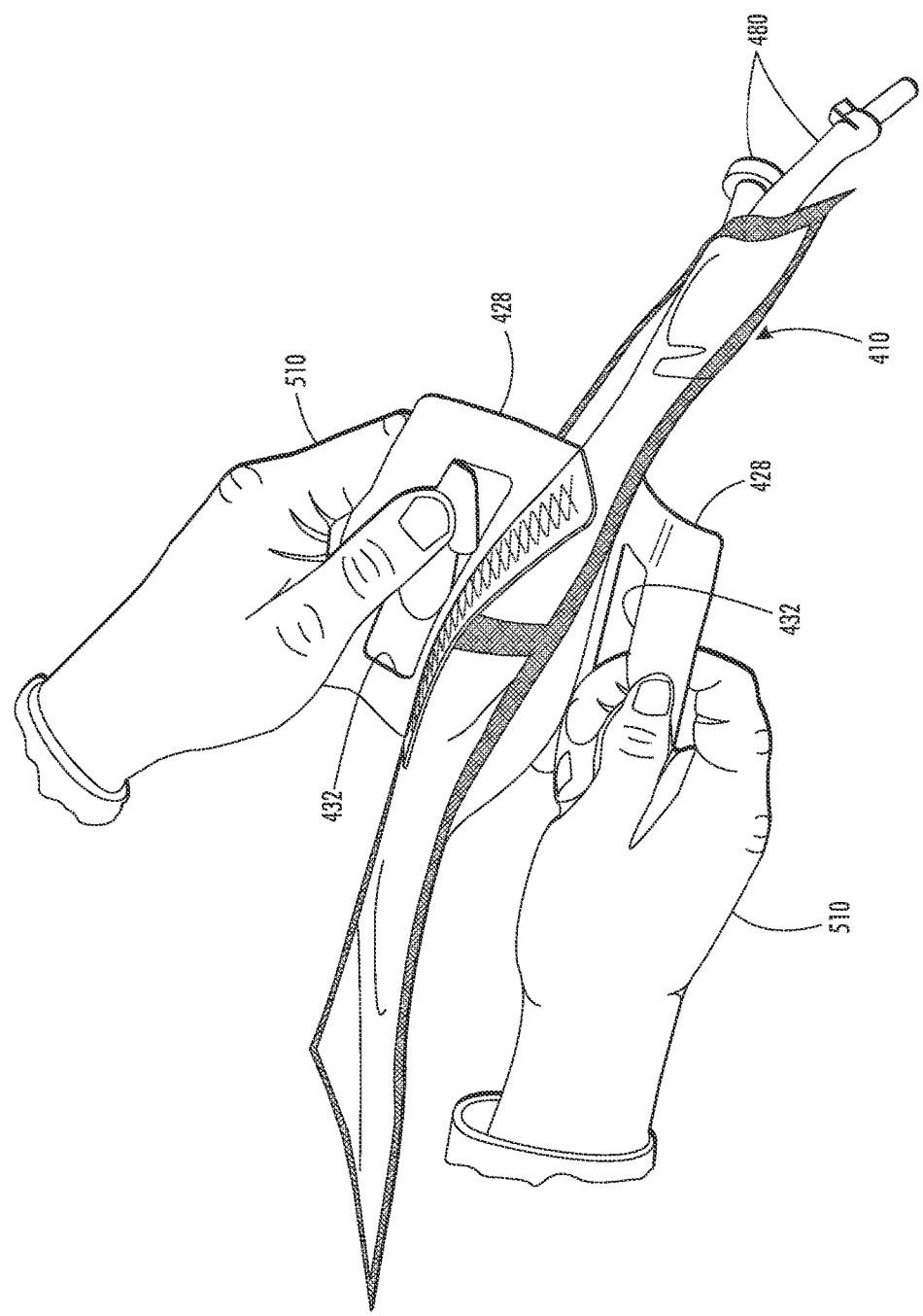
Figure 32:
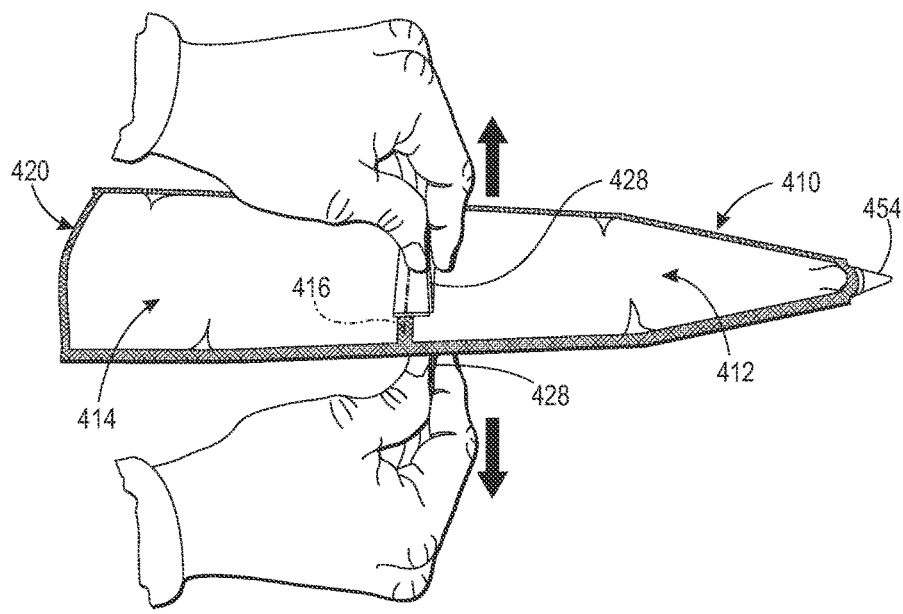
Figure 37:
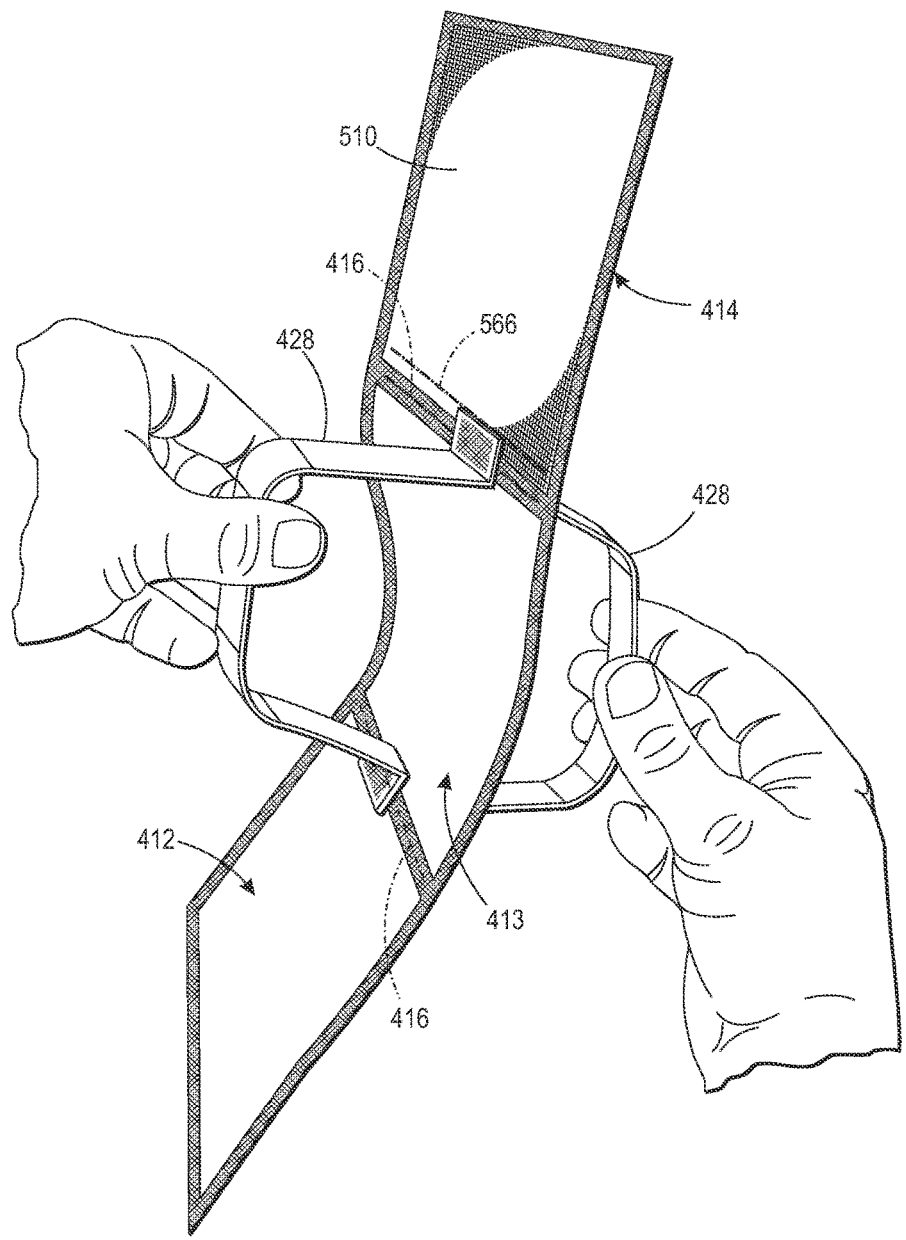

More specifically referring to a container that has been filled for use, upon exceeding the tear strength of the inner packet or seal the packet opens to release and permit mixing of the material in the packet with a material in the balance of the flexible pouch. The force may be applied using a number of methods including: (i) a user holding the container at the top and pulling on the anchor point for the link, possibly a tab or handle associated therewith, as depicted in FIGS. 7 and 21, for example, or (ii) an external force applied to the pouch between a pair of "handles" operatively associated with the exterior of the container to put the inner packet or its seal in tension, as depicted in FIGS. 25, 32 and 37. The thoroughly mixed material is then made available through a spout or similar fitment, a straw, or by cutting a corner or top of the pouch to permit pouring the contents out. As will be illustrated in several examples described below, the apertures and fitments may be placed at various positions, including within a surface of the container as well as at corners and edges.

In one alternative embodiment as depicted in FIGS. 14-22 for example, a predefined opening(s) 210 is provided within the surface of the inner packet 102 and a secondary removable film or layer seals over the opening until a tensile force is applied to a tether attached to, or is one and the same as, the removable seal, thereby peeling the sealing film/layer back from the packet when mixing is desired.

Figure 2:
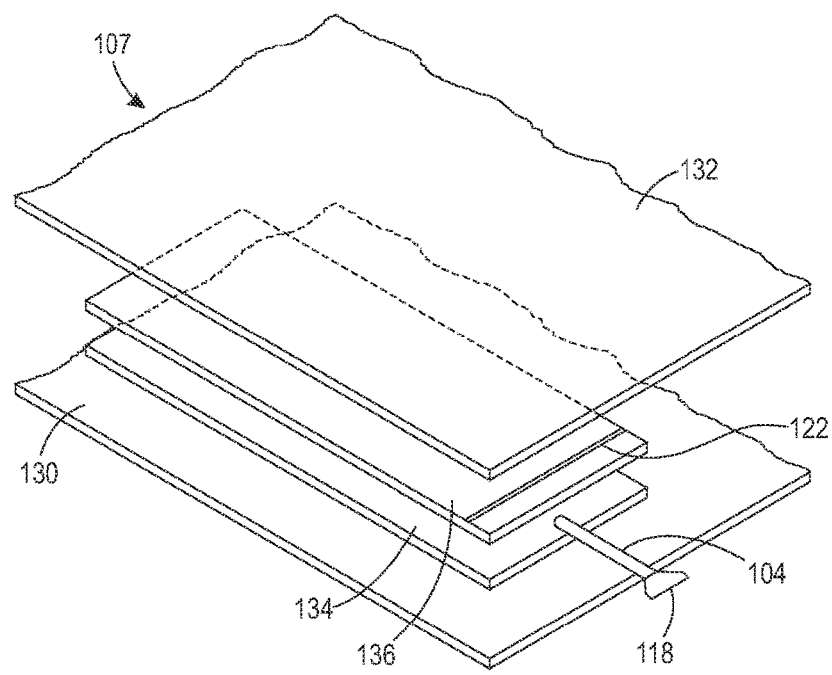
FIG. 2 is an isometric assembly view of the pouch in FIG. 1.

Having briefly referred to several examples and features of the disclosed packet-in-a-pouch container embodiments, attention is now turned to specific details of the disclosed embodiments. Referring to FIGS. 1 and 2, these figures illustrate a first embodiment wherein a flexible, packet-in-a-pouch container 100 includes an inner packet 102 contained entirely within the boundaries of a pouch 126. As noted above, pouch 126 may be a gusseted or self-standing pouch design, as well as other shapes and various sizes that may be determined by the particular application, ergonomic factors, quantity of material to be stored or mixed, etc. In the embodiment of FIGS. 1 and 2, packet 102 is attached along a common edge or seam at the proximal end 107 of the container 100 in order to facilitate filling of both the packet and pouch before sealing. At or near the distal end of packet 102 a tab or link 104 is attached to the packet for the purpose of pulling on the packet as will be described below. It will be appreciated that while depicted as being attached along one edge of the pouch 126, inner packet 102 may be attached in various configurations, including top-to-bottom, side-to-side, corner-to-corner or diagonally, etc. Inner packet 102 may also be a single-compartment packet as illustrated in FIG. 1, or it may be a divided packet, where two or more compartments are provided by the packet to enclose multiple materials, which would be mixed when the respective packet or compartment is ruptured. Also contemplated is an embodiment that includes multiple inner packets 102, wherein the packets are similarly opened by the various operations described below.

Packet 102 further includes specific structural elements to enable the release or admixing of the ingredient(s) or material contained in packet 102 into the material within pouch 126 in use. As seen in FIG. 2 one edge of packet 102 may be restrained and anchored along with a peripheral edge of pouch 126 (both edges 107), while tab 104 on the distal edge links to an opposing side of pouch 126. Now, it can be appreciated that by sealing the bottom and sides of wall panels 136 to 134 and 132 to 130 the assembly can be reliably filled through the remaining open region along the upper most edge (top 107) of packet 102 and pouch 126. The resulting assembly, complete with the substances therein, may then be subsequently sealed along the top edge 107 via heat, ultrasonic, chemical or possibly a mechanical closure method.

Notably, area 122 denotes a region that has been predisposed and designed to open in response to the application of a tensile force. In one embodiment area 122 may include a stress riser section where any stress in panels 134 and 136 is substantially concentrated and focused at area 122. In other words, area 122 provides a weakened portion of the packet wall by reducing the cross-sectional thickness, resulting in a localization of applied stress that ultimately tears or ruptures panel 134/136 along or near area 122. It will also be appreciated that other means for creating a stress riser are conceivable, for example a score caused by a laser or a creasing tool, as well as a sharp angle or bend in the wall panel of the packet that will further concentrate a force. The aforementioned stress riser at area 122 is equally applicable on back panel 134 as well and could yield in cooperation with panel 136, however severing just a single panel would yield similar results—permitting the material inside the packet 102 to mix with the material in the pouch 126. It is also contemplated that the stress riser could be or include a sharp indentation 138 along the sealed edge of panels 134 and 136. An alternative stress-riser is also contemplated relative to a conventional seal between layers of a package as will be described below.

A second alternative described herein is where region 122 is or includes a plurality of seals or sealed apertures, and where the application of force necessarily causes the seals to open or causes the seal to be peeled or otherwise removed to expose the aperture in packet 102. In any of the disclosed embodiments, it will be appreciated that in order to assure that the inner packet 102 is opened or unsealed without impacting the ability of the outer pouch 126 to retain both the packet and pouch materials therein for mixing, the force required for opening the inner packet must be less than the force required to unseal or otherwise cause a rupture of the outer pouch. As noted above, this can be achieved through one or more of the disclosed embodiments as applied to the inner packet 102. It is also contemplated that such a feature can be further facilitated through the use of a material or film for the inner packet wall(s) or panel(s) 134 and/or 136 that is inherently weaker than the outer pouch material or is otherwise weakened in some manner (e.g., scoring).

Figure 3:
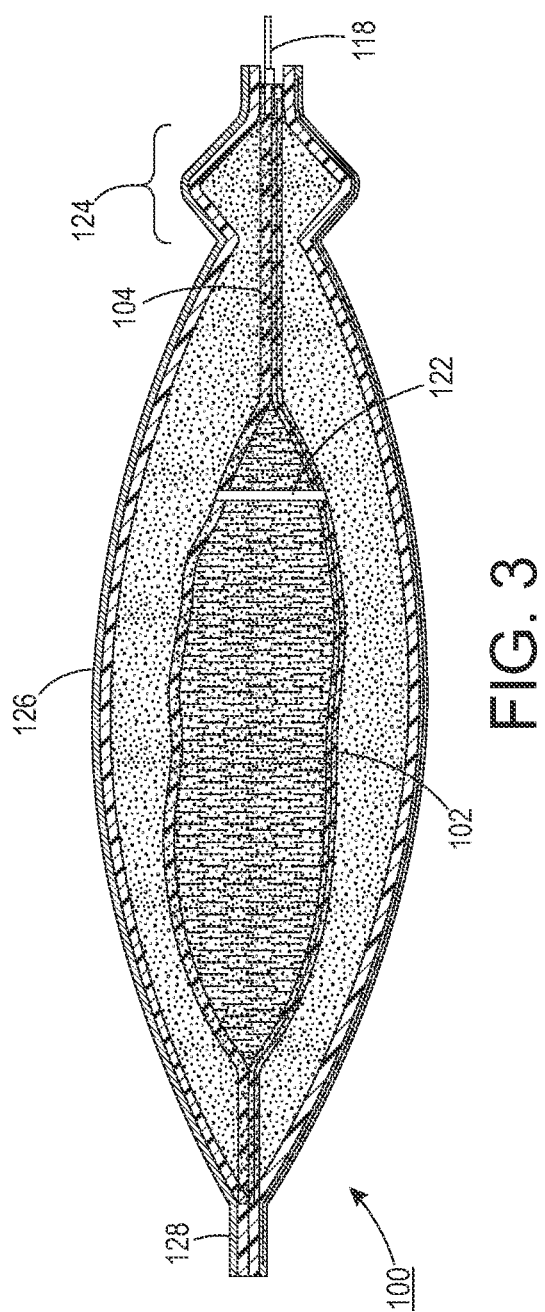
FIG. 3 is a cross-sectional view of a filled pouch and packet.
Figure 4A:
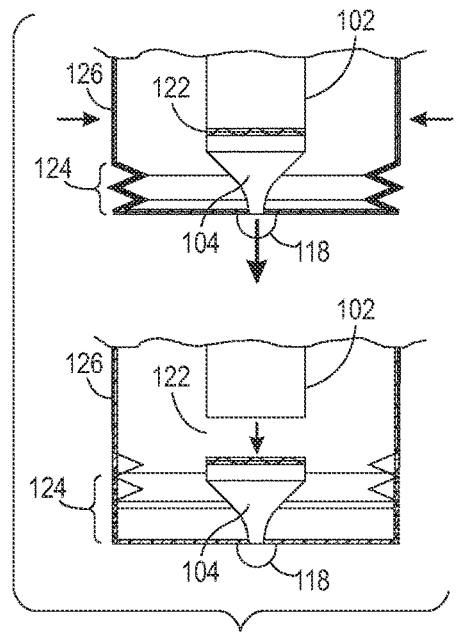
FIG. 4A is a front cross-sectional view of the pouch including an expansion pleat at the distal end.
Figure 4B:
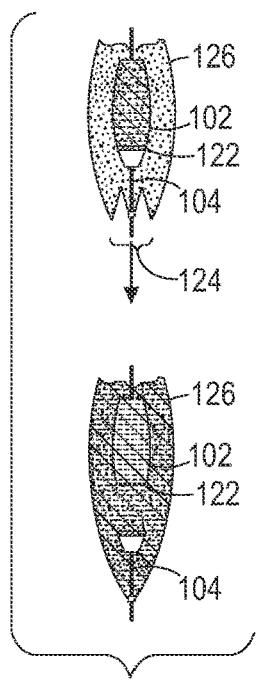
FIG. 4B is a cross-sectional view of the pouch showing an alternative pleat arrangement.

Turning now to FIG. 3, shown therein is a longitudinal cross-section of the container 100 in use, whereby the material contained within pouch 126 is isolated from the contents of packet 102 until ready for use. Referring also to FIGS. 4A and 4B, each shows respective expandable outer pouches 126, wherein a pleated or gusseted bottom section 124 is employed to permit expansion or extension of the pouch bottom. In both embodiments, when the bottom section 124 is moved relative to the opposite end or side of the pouch, and in particular the bottom end of packet 102, stress is applied at region 122 and results in the separation of the seal or opening of the packet at or near area 122.

Figure 5:
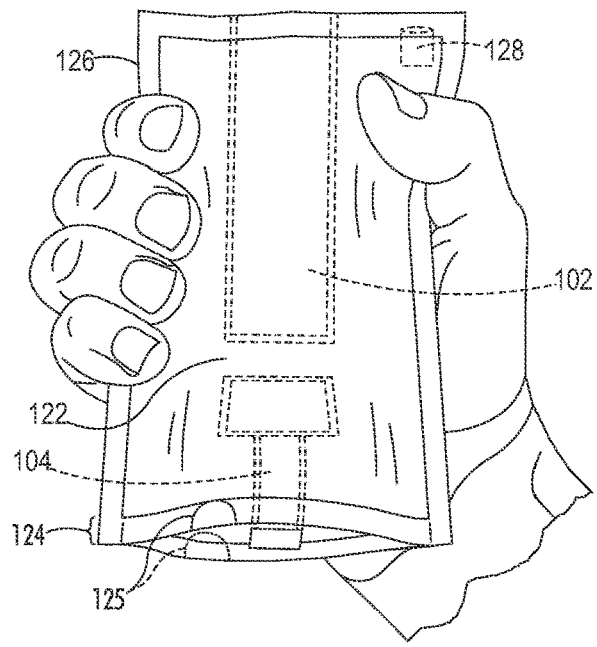
FIG. 5 illustrates an example of the manual manipulation of the pouch.
Figure 6:
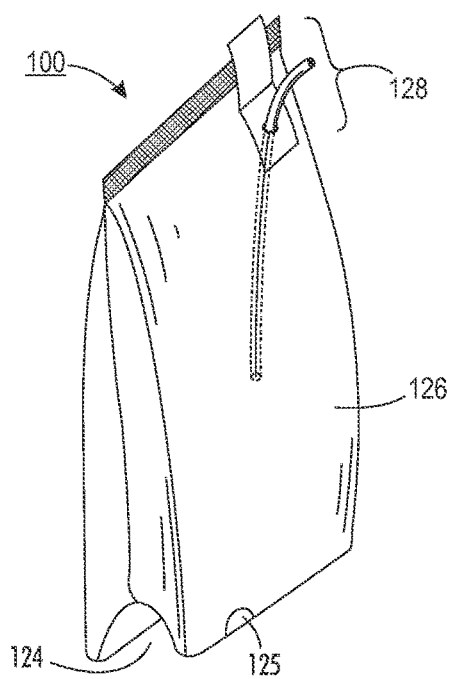
FIG. 6 is an isometric view of the pouch shown with a straw for access to the contents.

Flexure or pleated section 124 may be formed from a bi-fold or accordion fold at the distal end of pouch 126 (panels 130/132) to provide a pleat 124 that permits a dimensional increase when a force is applied to the outer pouch, for example, to tab or handle 118 by pulling thereon. In an alternative embodiment, the tensile force may be applied to open the inner packet by an external squeezing pressure applied manually to the outer pouch 126 by the user's hands, as depicted in FIG. 5, whereby squeezing forces the expansion of the pouch in a longitudinal direction (top-to-bottom) and a resultant pulling or tension is applied via linkage 104. In other words, when container 100 is ready for use, a force is applied by squeezing, which results in the displacement of a wall or edge of the outer pouch away from the interior packet such that link 104 pulls on the seal or other packet feature in a manner sufficient to open packet 102 and release the material therein (FIG. 4B top portion, where cross-hatching shows material in packet 102). Upon the opening of packet 102, intermixing of the material outside the packet and the material inside the packet occurs (represented by cross-hatching of entire pouch contents in lower portion of FIG. 4B), and may be aided by shaking or applying pressure with the hands to various portions of the exterior of pouch 126 to cause agitation. The mixture is then ready for use and may be withdrawn through an opening in the pouch container such as a re-sealable fitment or a straw 128, as depicted in FIG. 6, located near the proximal end of pouch 126. As will be apparent, once the pouch or container is opened, the further application of pressure with the hands can cause the mixed materials to be expelled, particularly in the case of viscous mixtures (e.g., yogurt with added foodstuffs such as fruit, granola, etc.). And, in the case of a beverage, the liquid mixture may be drawn through straw 128.

Pleat 124, as viewed in FIG. 4B, can be constructed as an inward fold(s) along the bottom of pouch 126, which unfolds as pleat 124 is drawn outwardly as further illustrated in FIGS. 5 and 6. In order to prevent pleat 124 from inadvertently expanding during storage and/or shipping a safety seal (125; see FIGS. 5 and 6) may be placed across the folded pleat 124 so as to constrain the pleat in a folded state, and serve to indicate, if broken, that potential opening of the inner packet and mixing has occurred. In the alternative, the individual pleats 124 may be bonded, one to another, by use of a conventional seal (heat, time, pressure) or pressure sensitive adhesive 127 (e.g., FIG. 7), or similar adhesive, applied therebetween.

Referring to FIG. 7, depicted therein is another alternative embodiment of the pouch 126. As described above, the pouch may be constructed from a flexible, thin-film plastic or similar layer(s) which may be translucent. Inside of the pouch 126, is a packet 102 extending the entire length of the pouch, and out the bottom thereof to form tab 118. The packet and pouch may be constructed from the same length of materiel, and the folding of the lower portion of the pouch (to provide for expansion and a self-standing pouch) but not the packet material, provides excess packet material that extends beyond the pouch to form the tab. The pouch and packet are sealed along both sides and the bottom, but remain opened at the top, along edge 107, for receiving materials into the pouch 126 and packet 102. Once filled, of course, the top edges of both the pouch and packet would be sealed. As described above, application of a tensile force to region 122 of the inner packet results in a tearing or similar opening of the packet and allows the contents of the packet to be mixed with those of the pouch 126. With the transparent or translucent nature of the pouch, or a portion thereof, the opening of the packet and mixture may be confirmed whenever the combination of materials in the pouch and packet results in a perceivable change in appearance of the pouch contents.

In summary, multi-compartment container 100 comprises an outer flexible pouch 126 having a first material therein along with an inner packet 102 having a second material stored within said packet, and a link (e.g., flexible link, extended portion of the inner packet, etc.) between a surface or seal on the inner packet (134, 136) and a surface of said outer pouch (130, 132). One method of using the multi-compartment container 100, includes applying a force to a surface of the outer pouch, where the link or packet is attached, to create a tensile force along at least a portion of the surface (130, 132) of the inner packet, the tensile force, of course, being of sufficient magnitude to cause the tearing of the inner packet surface and thereby resulting in the release of the second material to combine with the first material of the outer pouch.

Figure 22:
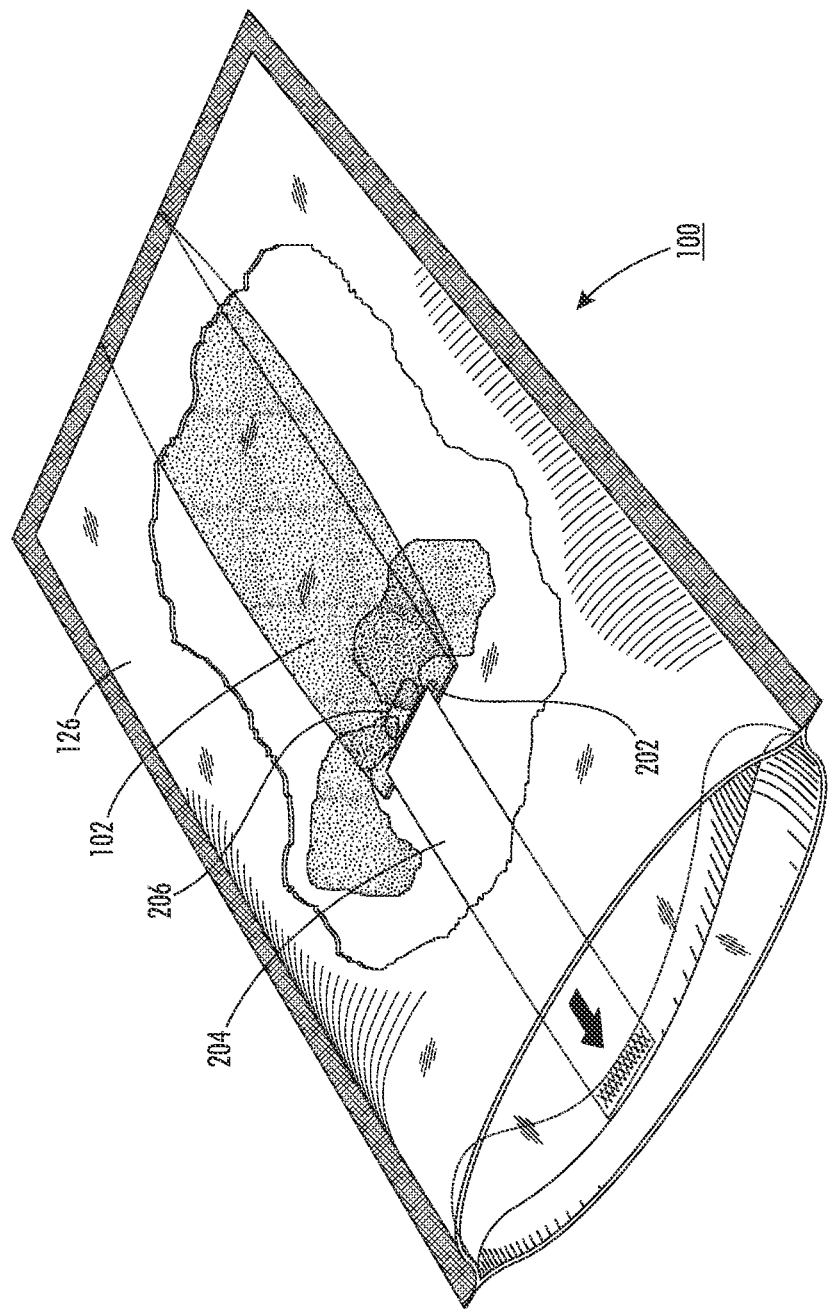

Turning now to FIGS. 21-22 depicted therein is an alternative embodiment of the multi-compartment container or package 100, whereby the linkage is in the form of a tether 204 attached to a top portion of seal 202 that is covering an opening 206 in packet 102. It can be appreciated that, as a tensile force is applied to tether 204 (e.g., by pulling on the bottom of the container), seal 202 is peeled away from packet 102, thereby exposing the opening 206 and releasing material within the packet 102, which may be subsequently mixed with the contents of pouch 126. Seal 202 may be affixed to packet 102 by a conventional heat seal or other suitable adhesive or other binder method.

It is further contemplated that seal 202, in one embodiment, comprises a continuation of tether 204 that extends over aperture or opening 206 and provides both the sealing, pealing and tether in a continuous strip. Additionally, in order to assist in the evacuation of the material out of packet 102, and prevent material from bridging of the opening, a member (not shown) may be attached to the underside of seal 202 and be inserted or pass through the opening 206 so as to reside within the material contained within packet 102. Then, as seal 202 is peeled back the member, which may take the form of a spiral helix, a scoop, possibly a plunger, or some similar configuration, engages the material and draws it outwardly towards opening 206, or at least prevents the material from bridging the opening 206.

Once again, although depicted as attached along a bottom edge of the container 100, inner packet 102 may be attached in various orientations, including top-to-bottom, side-to-side, corner-to-corner or diagonally, etc. Inner packet 102 may also be a single-compartment packet as illustrated in FIG. 21, or it may be a divided packet, where two or more compartments are provided to enclose multiple materials, all of the compartments could be opened and the contents thereof mixed when the inner packet is ruptured. Also contemplated is an embodiment that includes separated inner packets, wherein the packets are similarly connected or tethered to different tabs or anchor points and opened by independent pulling operations. Additionally packet 102 may share a side or edge that is common to both the packet as well as the outer compartment.

Figure 14:
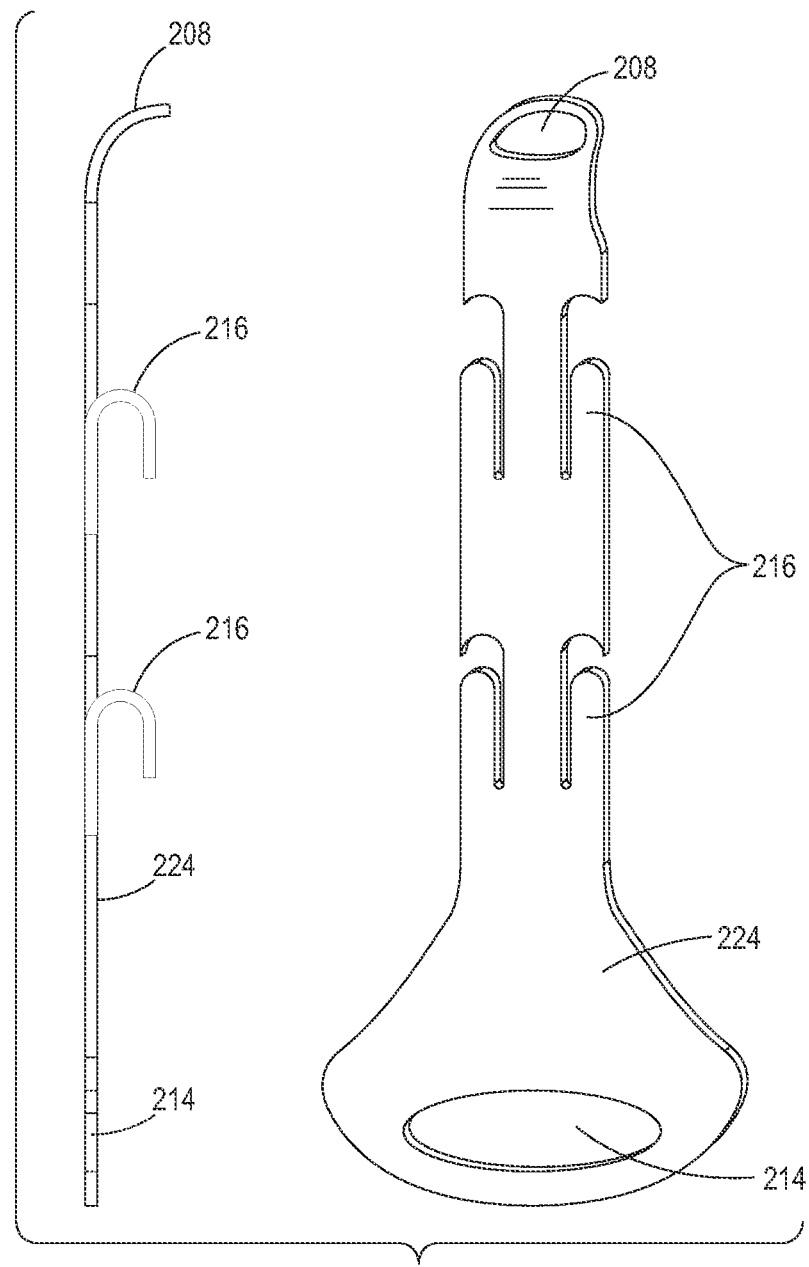
FIG. 14 provides views of a sealing member in accordance with a disclosed embodiment.
Figure 15:
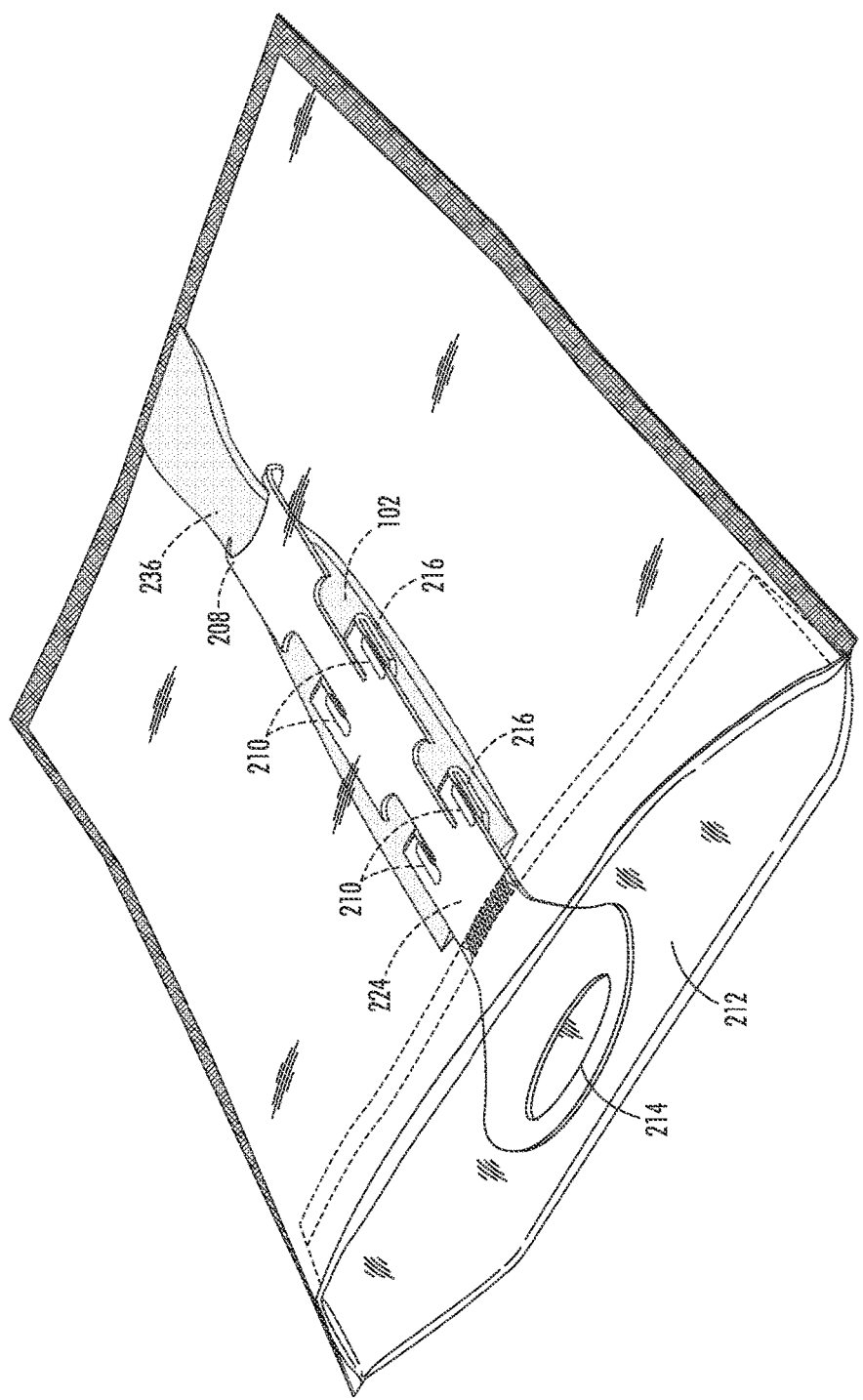
FIG. 15 is an exemplary illustration of container including a peel away member having a packet cinch as depicted in FIG. 14.
Figure 16:
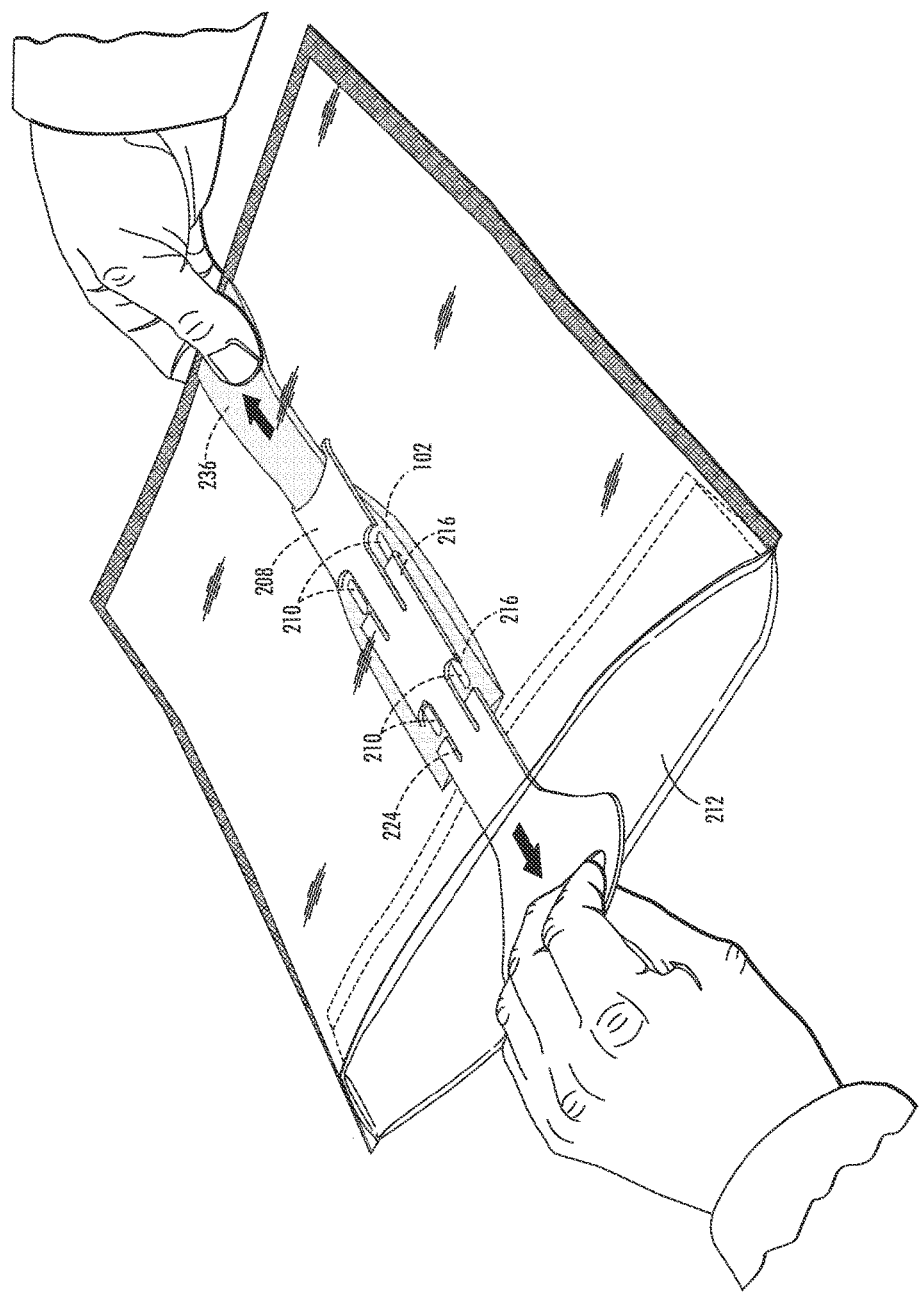
FIGS. 16-20 are illustrations of the alternative configurations of the container of FIG. 15.
Figure 17:
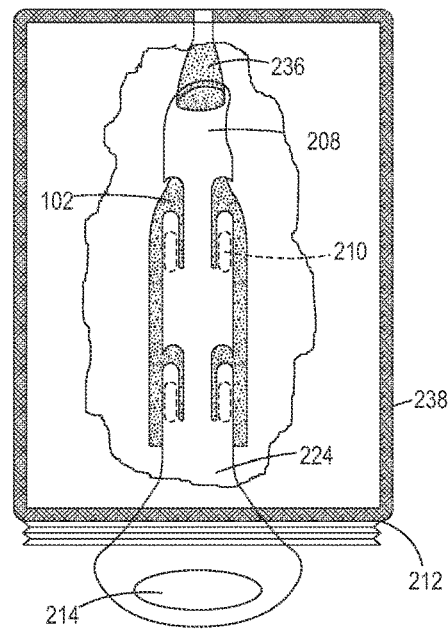
Figure 18:
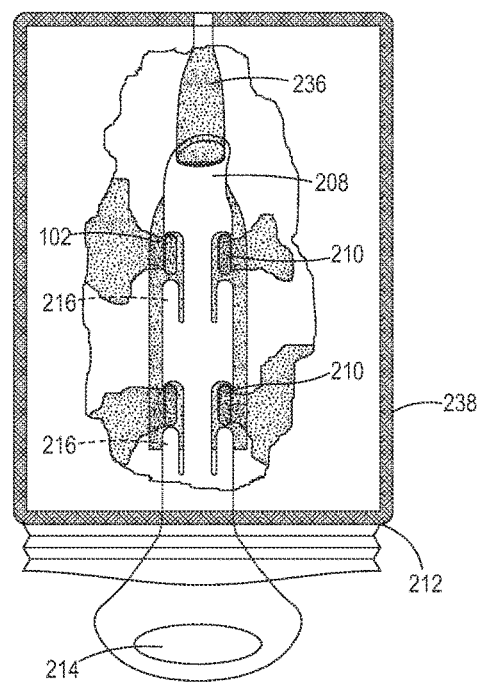

In a similar yet alternative embodiment, for example those depicted in FIGS. 14-20 the linkage includes a sealing member 224 along with a handle 214, and a turned-back, peel-off seal portion 216. The linkage may further include a packet cinch 208, as shown in FIGS. 14-15. In FIGS. 15 and 17, sealing member 224 is further shown installed on inner packet 236. Peel seals 216 are attached over openings 210 in the packet. When in place the peelable seals 216 act to retain the contents of packet 236. Once the seal 216 is removed, by applying an outward force on handle 214 while grasping along the top edge of pouch 238, the contents of the packet 236 are exposed. Pleat 212, attached to seal member 224, allows for pouch expansion in the longitudinal direction, and the peeling of one or more seals 216, to allow the contents of packet 234 to be exposed, through openings 210, and to mix with the material within pouch 238.

As noted above, the linkage may further include a packet cinch 208. The cinch encircles packet 236, preferably above the openings 210 and as handle 214 is pulled (e.g., FIGS. 16 and 18), the seals 216 are removed and the cinch applies pressure to the upper end of the packet to force material remaining within the packet toward openings 210.

Figure 19:
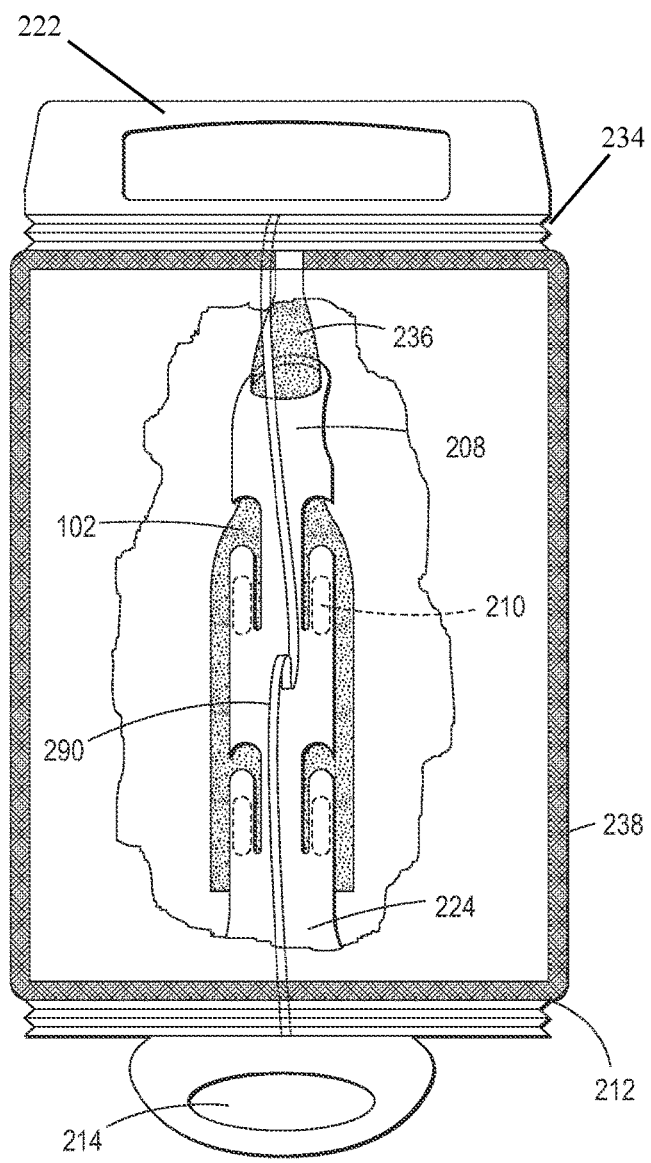
Figure 20:
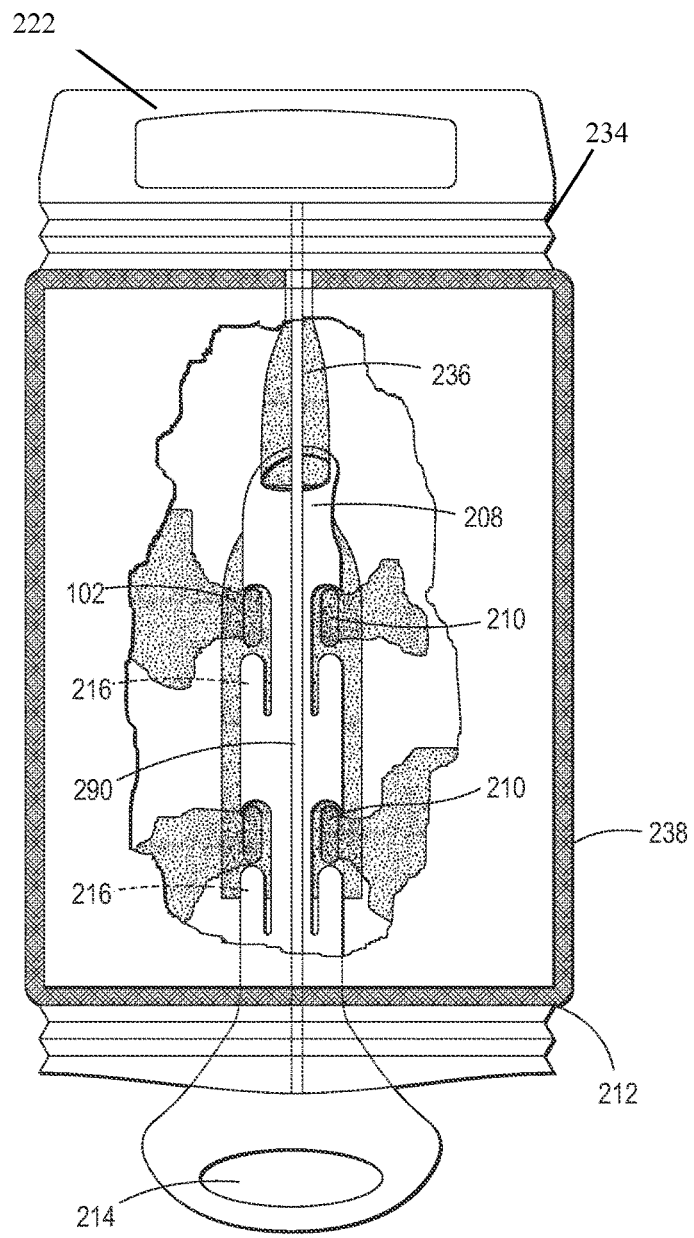

The displacement of the sealing member 214, relative to packet 236, may be limited by the expanded dimension of pleats 212. In order to increase the travel distance it is plausible to add additional pleats at the pouch bottom or pleats 234 to the top of pouch 238, so that when a force is applied between handle 214 and 222, pouch 238 and packet 236 move relative to one another and thereby increase the maximum distance of travel to further ensure the entire contents of the packet is expelled as represented in FIG. 20. As illustrated by FIGS. 19 and 20, such an embodiment may further include a secondary or stop member 290 (e.g., a stop strap), similar to the linkage, where the stop member or strap prevents over-stressing of the outer pouch in order to prevent rupture of the container after the seal is separated. In the un-opened packet configuration of FIG. 19, the stop strap is loosely present in the outer pouch. And, once the handles are pulled, as depicted in FIG. 20, the stop strap is fully extended and prevents further expansion of the pouch pleats 212.

In an alternative peelable seal embodiment, a central expansion region may be employed, where pleats, or folded back pouch material, provides the ability for the container to change from a substantially square pouch (box-shape) to an elongated rectangular pouch by pulling of the pouch ends. During this transformation a link or tether as previously disclosed peels a seal from a partition or compartment on the side of the pouch, thereby exposing the materials within the respective compartments to one another. Notably, in this embodiment, the packet and the pouch share common sides, essentially only being separated by a single peelable partition or seal. Additionally a safety band or other tamper/expansion indicator encircles at least a portion of the unmixed pouch to discourage accidental mixing, as well as indicating when mixing has occurred.

As described herein, and with respect to to the various figures discussed above an embodiment of the multi-compartment container, includes an outer flexible pouch formed from a flexible material; and an inner packet, substantially enclosed within the outer flexible pouch, wherein the inner packet is designed to contain at least one substance for mixing with a material within the outer flexible pouch. Depending upon the particular embodiment or application for the container, as further discussed below, the materials employed for the outer pouch and/or inner packet may be liquid impervious materials such as polymeric films and the like. The inner packet is operatively connected or linked (e.g., by a tether or tab) to an anchor point on the outer flexible pouch. In use a tensile force applied to the anchor point causes the opening of the inner packet and thereby permits mixing of the substance in the inner packet with the material in the outer flexible pouch without requiring direct access to the inner packet. In one of the embodiments, the inner packet includes an opening covered by a seal layer that is peeled or otherwise removed to expose the opening in response to the applied force.

In another of the disclosed embodiments, the anchor point includes a handle or other type of looped member suitable for grasping by a user's hand or a mechanical member passing at least partially around the handle or looped member, between the member and an outer surface of the pouch or container. In another embodiment, the inner packet includes a frangible seal along at least a portion of its perimeter, where the frangible seal is broken to expose the contents of the packet in response to a tensile force applied via the anchor point.

Adjacent Compartments)

Figure 23:
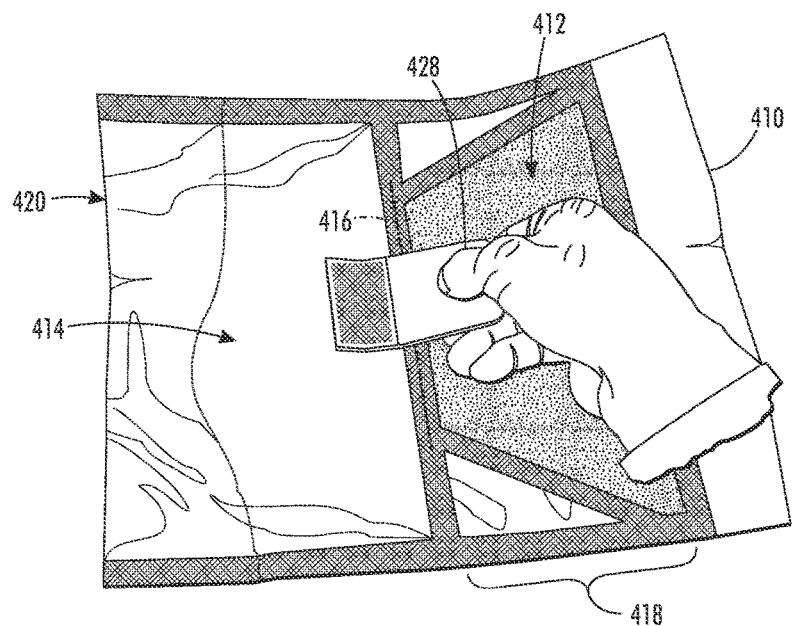
FIGS. 23-26 are exemplary illustrations of alternative embodiments of the container as it may be employed in a medical application.

Referring now to the alternative embodiments of FIGS. 23-37, as with the earlier embodiments, a container 410 may be constructed from a flexible, thin-film plastic, flexible web, rubber or similar material layers that are impervious to the outside atmosphere such as known materials used for stand-up pouches, and including films, flexible webs and laminates with either one or both sides being transparent or foil-faced to provide a metallic finish. As depicted in FIG. 23, container 410 includes a packet compartment 412 within a pouch 414, such that packet region 418 is at least a four-layer package, with the innermost layers defining the packet and the outermost layers defining the pouch. The packet compartment and pouch compartment are separated by a frangible seal along at least a portion of line 416. The embodiment depicted in FIG. 23 also includes at least one and possibly two or more external tabs or loops 428. The tabs are operatively associated with the container, and are suitable for applying an opposing force to the container at or near the seal line 416 so as to cause separation of the inner packet seal, without applying, or at least minimizing, internal pressure in either compartment. It will be appreciated that in FIG. 23, the tabs 428 are in the nature of a handle or similar configuration allowing at least the fingers of a user's hand or even a mechanical device to pass through opening 432 so that the loop may be easily grasped and pulled. As illustrated in FIG. 30, for example, handles 428 may also be foldable along at least one line 430, so that when folded the handle(s) presents a reduced size and covers less of the package surface. Moreover, the foldable handle may be held in the folded position using a temporary fastener (e.g., hook and loop) or adhesive such as a pressure sensitive adhesive or a temporary-hold, peelable adhesive 436 (e.g. hot melt glue, credit card glue).

Referring also to FIGS. 24-37, depicted therein is a multi-compartment, flexible container 410. The container includes a plurality of compartments, for example, first compartment 412 and a second compartment 414. Each of the compartments is suitable for receiving a material therein, prior to or after being sealed. In the embodiments depicted, at least a portion of the second compartment is adjacent the first compartment and they share a common or adjacent border (e.g., seal line 416), so that an adjacent portion of the container between the compartments includes a separable or frangible seal that, at least initially, prevents intermixing between the compartments. The depicted embodiments also include at least two external tabs 428. The tabs are operatively associated with, and may be permanently attached to, the container, and are suitable for applying an opposing force to the container at or near the seal to cause or facilitate separation of the seal, without applying compressive pressure, or pressure that would rupture the outer seals, in either compartment 412 or 414. It will be appreciated that in at least FIGS. 23-25, the tabs 428 are in the nature of a handle or similar configuration allowing at least the fingers on a user's hand 510 to pass through an opening 432 so that the tab may be easily grasped by the user. As will be appreciated, the use of tabs in the form depicted also permits at least one of the external tabs to serve as a carrying or hanging handle for the container, where the container can be supported by said handles, both before and after mixing of the components occurs.

Figure 39:
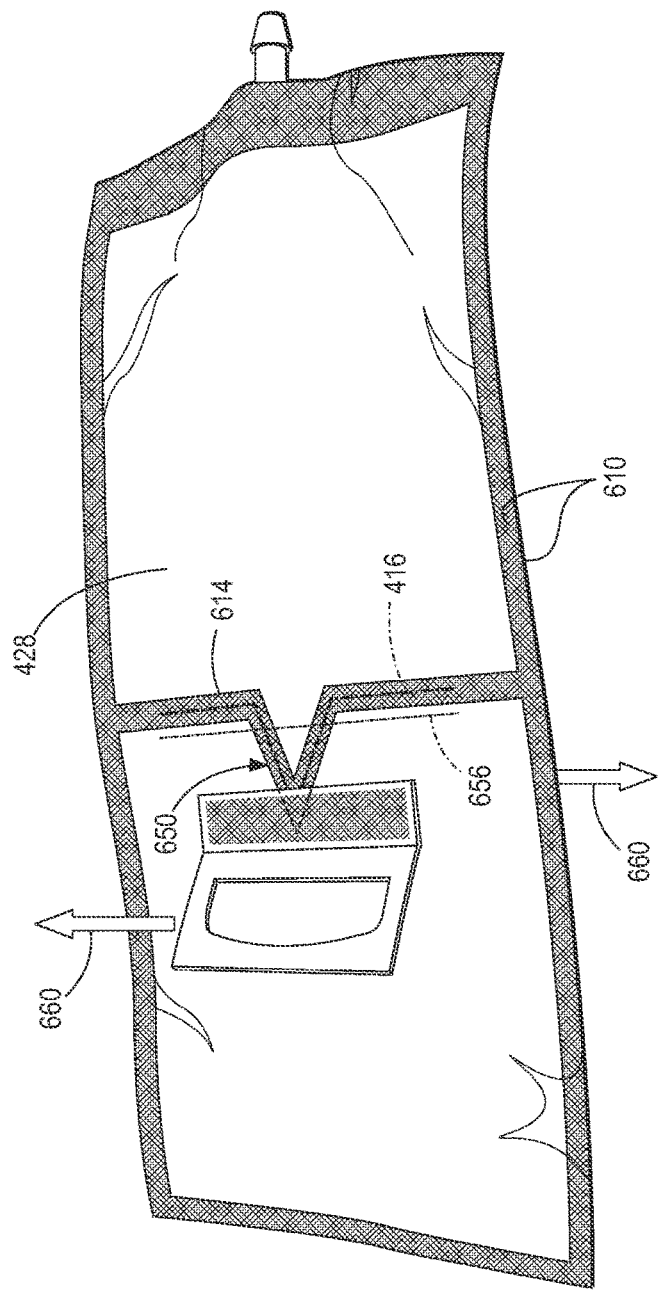
FIG. 39 illustrates an alternative embodiment of a seal with an associated stress concentration feature.

In order to assure that the seal can be ruptured with a reasonable amount of force, it is contemplated that the shape and configuration of the seal may focus or concentrate the applied force. For example, referring briefly to FIG. 39, there is depicted an embodiment where a portion of the seal 614 has a point or similar stress concentrating feature 650, where when the layers 610 of the container are pulled apart in the direction of arrows 660, the pulling force is at least first concentrated in the region of portion 650, facilitating the initial peeling of the seal at this location, and thereby opening the seal between compartments 412 and 414, and possibly allowing additional length of the seal along line 416 to be more easily separated. In the embodiment depicted, the seal stress concentration is a point or "V" shape, however, it will be appreciated that other shapes may be employed, and that the region extending beyond line 656 may be a function of the type and shape of tabs or handles that may be used to facilitate seal separation. Such a stress concentration feature(s) may be employed in several of the embodiments for containers and packaging disclosed herein.

Similar to the embodiments described above, an indicia or way to ascertain if a tear or rupture in the packet has occurred may be provided. Once again, a color dye may be added to the material contained within at least one compartment of the container, so that when the compartment materials are indeed exposed to one another or mixed, a visual change in the color of the mixture in compartment 414 is apparent, particularly when viewed through a clear portion of the container or a window in the wall(s) of the container (e.g., window 106 of pouch 126 in FIG. 1). Thus, when mixing has been intentionally initiated, the colorant will confirm that the contents of the respective compartments have been mixed. An alternative would be to rely on the mechanical operation of the packet-in-a-pouch, whereby the indicia could include a mechanical seal operatively associated with the inner packet or flexible link as described above, where tearing the inner packet reveals an indication message or advisement that was previously occluded within the fold of a pleat, tab, etc. Further examples of indicators include pH indication, refractal light/optical, impedance, viscosity, water activity (Aw), density or osmolality, chemilluminescence, luminescence or other characteristics of the mixed materials that may be sensed. Other mechanical seals or indications may also be present on the pouch, such as a tear strip or a safety seal, as described relative to earlier embodiments.

Figure 24:
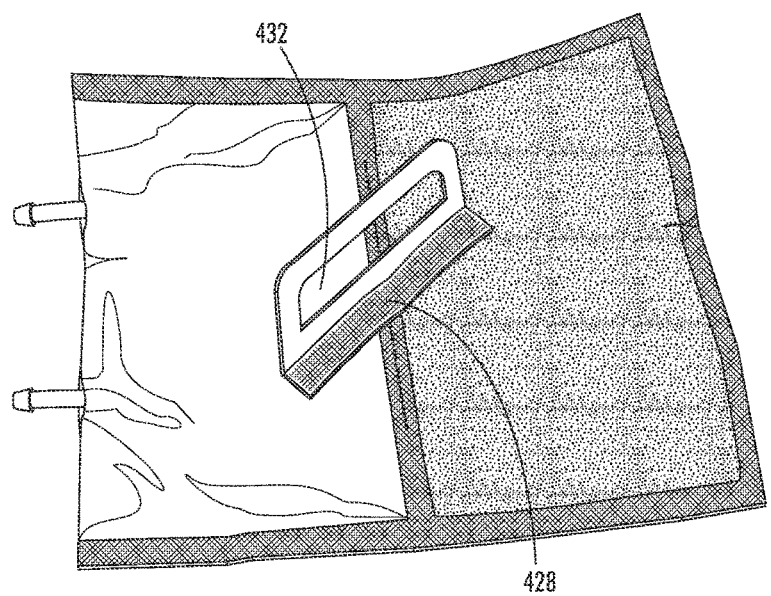
Figure 26:
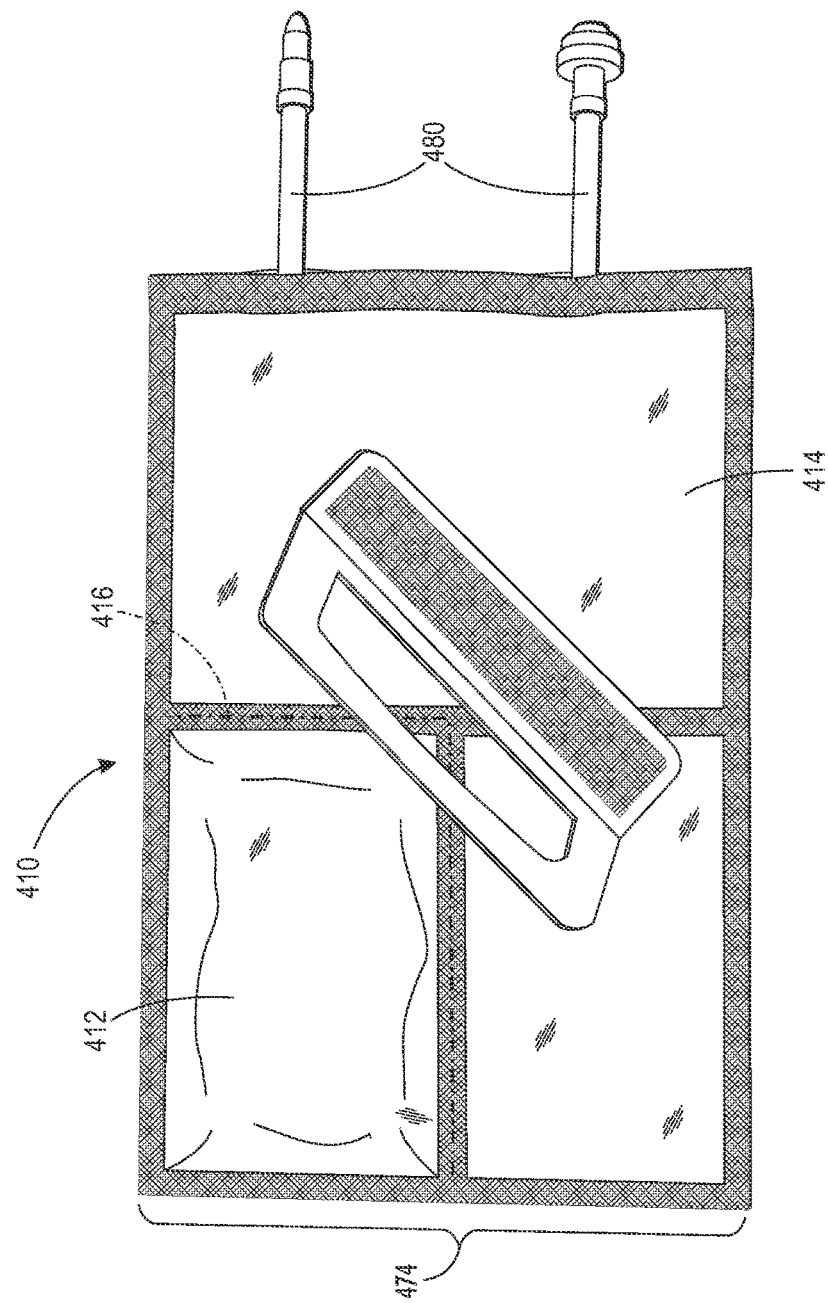

Referring to the embodiment of FIGS. 24-26, for example, the container is one that may have an application that is particularly intended for a medicinal or pharmaceutical use. In such an embodiment, the compartments 412 and 414 of the container are employed, to hold pharmaceutical or similar materials. As such, the container 410 includes fitments 480 in the nature of intravenous (I-V) connections, and/or needle injection ports, which are suitable for attachment to various drug delivery systems. Moreover, one or more of the fitments may be suitable to receive materials through the fitment for storage and/or mixture with the other materials stored or mixed in the compartments.

Figure 27:
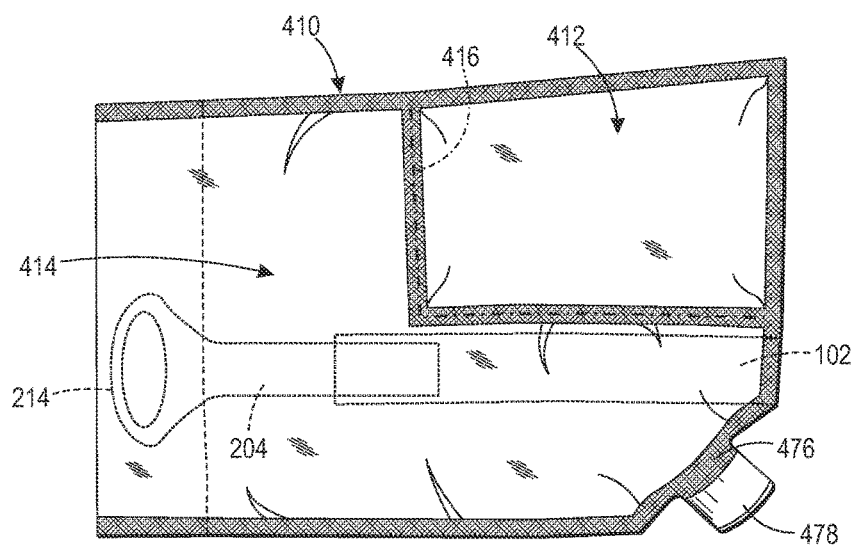
FIGS. 27-30 are exemplary illustrations of alternative embodiments of the container including handles and a resealable fitment.
Figure 28:
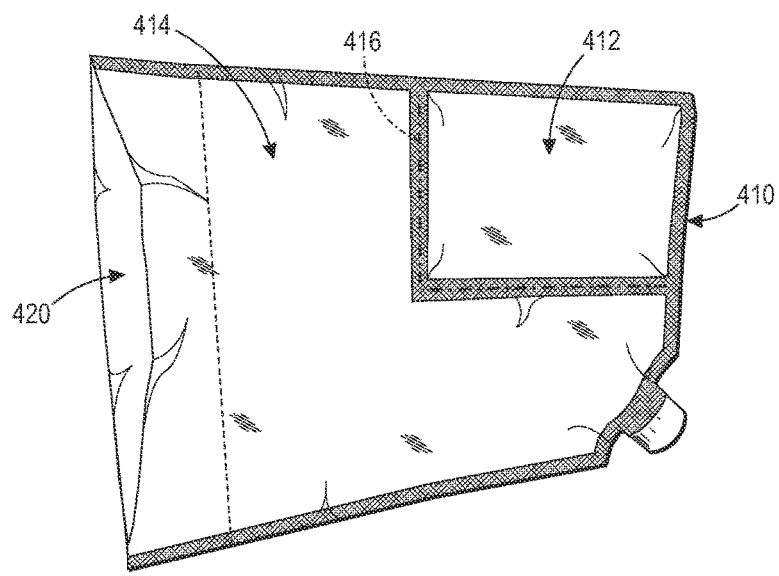
Figure 29:
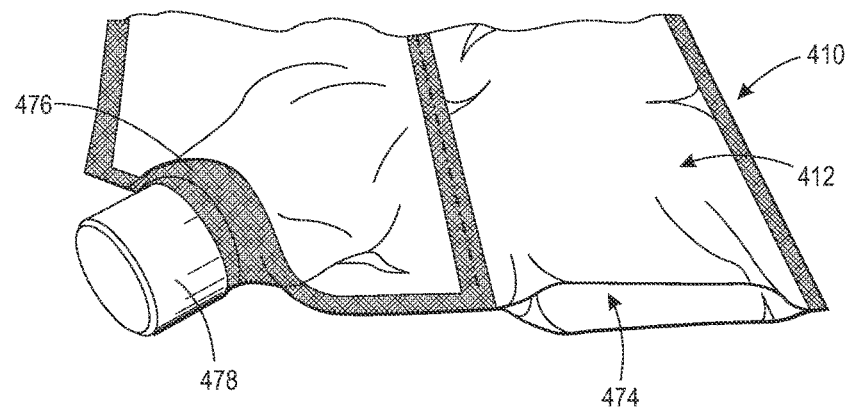
Figure 30:
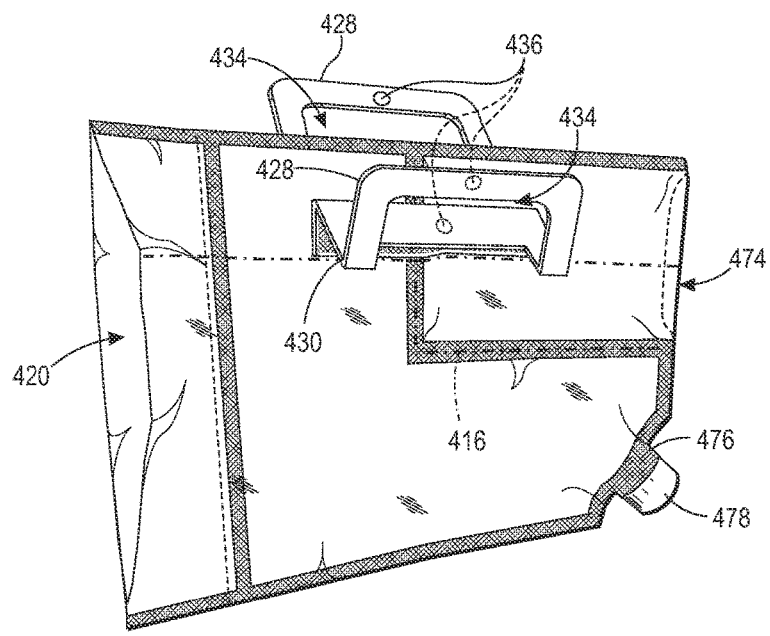

As noted with respect to the earlier embodiments, container 410 in FIGS. 24-30, may include surfaces or layers of a flexible, liquid-impervious material. The tabs 428 may also be formed of a flexible material and one or both tabs may be employed as handles to carry or hang the container before or after mixing of the contents. Considering, for example, the embodiment depicted in FIGS. 28-30, the container 410 is a fillable container and once again includes a smaller compartment 412 and a larger compartment 414, separated by a frangible or separable seal along at least a portion of line 416. As specifically illustrated in FIG. 30, tabs in the form of handles 428 include openings 434 spaced at or above the top of the container in order to assure that the tabs may be used to carry the container. More specifically, the tabs are positioned and sized to extend a graspable portion of the handle beyond at least one edge of the container, when grasped together, so that a user's hand may be inserted through both of the openings 434 to provide the carrying handle. Also included with container is a fitment 476 that includes an opening and a removable/resealable cap 478. Moreover, as illustrated in FIGS. 29-30, the fillable container may be pre-assembled with the fitment 476 and cap 478, and the smaller compartment 412 left open along edge 474 so that compartment 412 may be later filled and sealed and then stored or shipped in that condition prior to filling compartment 414 for mixing and use. Also contemplated is the use of a resealable seal for the seal between the compartments, where the seal may be initially separated to permit mixing of the materials in the separate compartment, then the seal may be resealed for various purposes, including to provide a specific dosage/dispensing measurement, etc.

Other fitment types contemplated for use with the disclosed packaging or container include conventional bottle tops (e.g., soda bottle tops), spray bottle tops, where the fitment is a style suitable for attachment of a conventional spray bottle "handle" such that an end user might use the container by adding a liquid, inserting the spray bottle head, and then opening or bursting a cleaning or disinfecting agent in the inner packet or compartment to provide a spray-able solution.

Referring also to FIG. 28, where dashed line 416 illustrates the frangible seal between compartments 412 and 414, it is clear that the first compartment 412 is formed within the confines of the second compartment 414. And, as illustrated, the container 410 may include at least one pleated surface or edge 420 to allow for expansion of the contents (particularly in a fillable container depicted in FIGS. 28-30).

Figure 31:
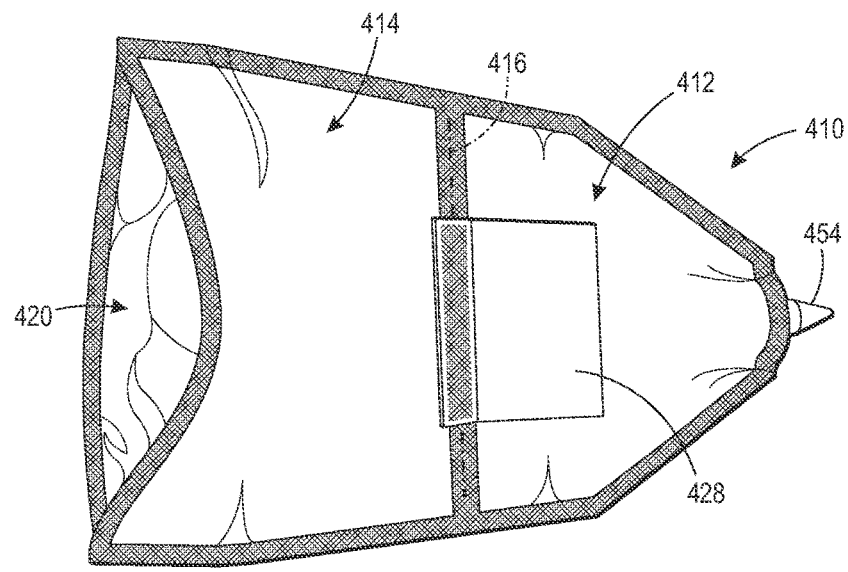
FIGS. 31 and 32 are illustrations of alternative embodiments of the container with a dispensing spout and a tapered profile for at least the adjacent compartment.
Figure 33:
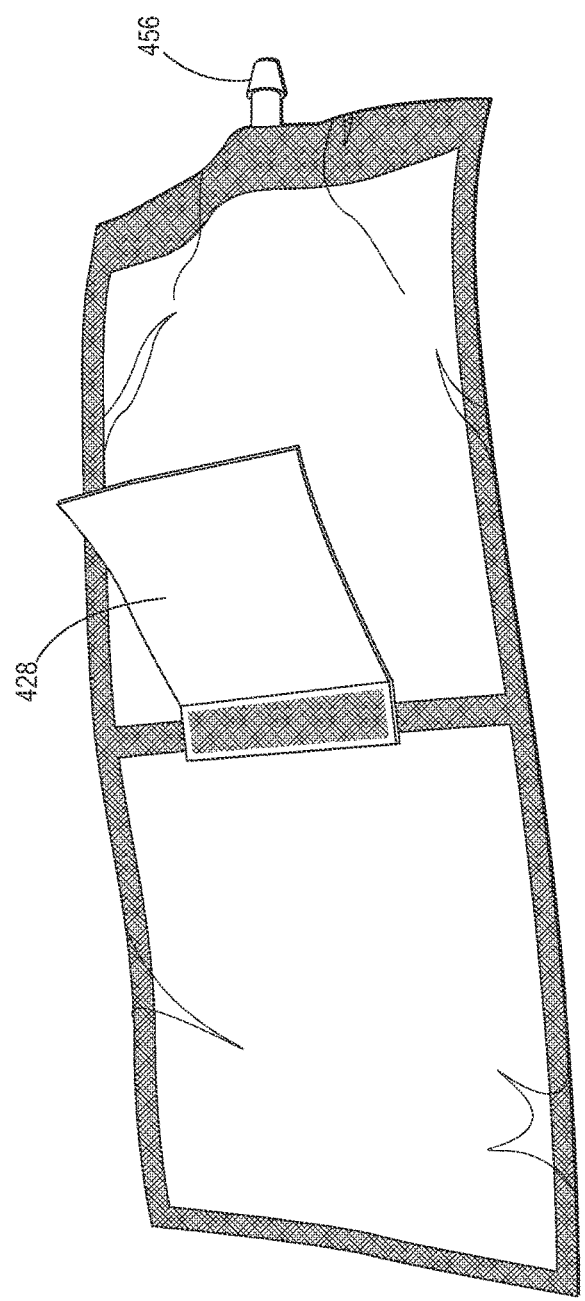
FIG. 33 illustrates the container with an alternative fitment configuration.

Turning briefly to FIGS. 31-32, another container embodiment is illustrated, this time with a fitment that serves as a dispensing device for the contents of the container. Once again, the container includes a first compartment 412 and a second compartment 414, and a frangible seal between them that may be opened or disturbed by the application of opposing or tensile force to the tabs 428. The frangible seal, once broken, permits the intermixing of the contents, by manually or mechanically manipulating (e.g., kneading, shaking, rocking, or squeezing) the container. Once mixed, the contents of the bag can be dispensed via the fitment 454 that terminates in a conventional caulk-style tip. Such a tip is customizable in both size and angle, and may be suitable for various applications from caulking, dispensing of mixed epoxy or other two-part adhesives, or even for cake decorating (where the cake decorating material is produced by a mixing of the material in the first compartment and a material in the second compartment once the seal between the compartments is separated). FIG. 33 illustrates a similar package design, although with a fitment 456 that permits the container to be connected to a variety of other devices such as a method of lubrication for bearings or other types of applications requiring a source product that feeds or dispense the contents, for example via tubing, or as directly input to machinery or other equipment. In other words, the aperture or fitment includes a spout. In yet another alternative embodiment, the spout may include a filter.

Although generally described above as being made from a flexible material, packet 102 and compartment 412 is not limited to a flexible film, as other materials may prove to be practical in specific applications. For example, packet 102 could be assembled by molding polystyrene into pre-filled capsules that would then be inserted and attached within pouch 126.

In the alternative container embodiments of FIGS. 23-37, as with the earlier embodiments, the container 410 may be constructed from a flexible, thin-film plastic or similar material layers that are impervious to the outside atmosphere such as known materials used for stand-up pouches, and including films, flexible webs and laminates with either one or both sides being transparent or foil-faced to provide a metallic finish. Specific examples of materials that may be employed to form the outer pouch and/or inner packet are polyethylene terephthalate (PET), polyester films such as Mylar® or aluminum oxide (AlOx) coated. PET can be aluminized for heat reflection by evaporating a thin film of metal onto it which also reduces its permeability to liquid and similar materials and light. PET is further suited for flexible food packaging, such as carbonated water, fruit juice or other sterile liquids. Similarly, one or more components of the container may use polylactic acid (Polylactide) a biodegradable polymer produced by NatureWorks LLC.

As illustrated by the various package embodiments, the container may include at least one aperture or fitment for accessing (filling or removing) the interior of at least one compartment. As illustrated relative to FIGS. 27-30, for example, the aperture of fitment 476 is resealable with a cap 478.

In the embodiments depicted in FIGS. 34-37, one or more of the layers 510 of material used to assemble the container 410 may be formed of a vapor or gas permeable or even a fluid permeable material, wherein at least gases or gaseous matter may be exchanged through the material. For example, such materials may include a polypropylene, polyethylene, or other non-woven materials such as flashspun high-density polyethylene fibers (e.g., Tyvek® from Dupont™). Another alternative, to achieve the desired vapor or gas permeability, is to provide micro-perforations to at least a region of the container surface in order to permit gas within the container to escape. Yet another embodiment contemplates the use of a fitment for the container, wherein the fitment itself provides the ability for gas exchange but prevents any non-gaseous contents (solid or liquid) from exiting the container. One specific embodiment contemplated is the use of a conventional fitment with a resealable cap (e.g., fitment 476 and cap 478 in FIG. 36), where the opening of the fitment itself has a gas-permeable membrane 484 therein (e.g., Tyvek®, or Gor-Tex® from W. L. Gore and Associates) that permits gas or vapor to escape from the container, but prevents the exchange of liquid or solid material (in or out of the package). In a further alternative, a cap associated with the fitment may have a pressure safety feature, so that if the reagents mixed within the container result in the creation of an expanding gas, the cap will open under pressure to avoid rupture of the container itself. One example of such a cap may be a snap-on cap that releases under sufficient pressure. As will be described in more detail below, the use of such permeable packaging materials may permit the admixture of components, which may all be initially contained within vapor impermeable compartments, in a portion of the package that has the vapor permeable package surface so that the mixed components may produce a desirable affect to the environment in which the package is deployed.

Figure 34:
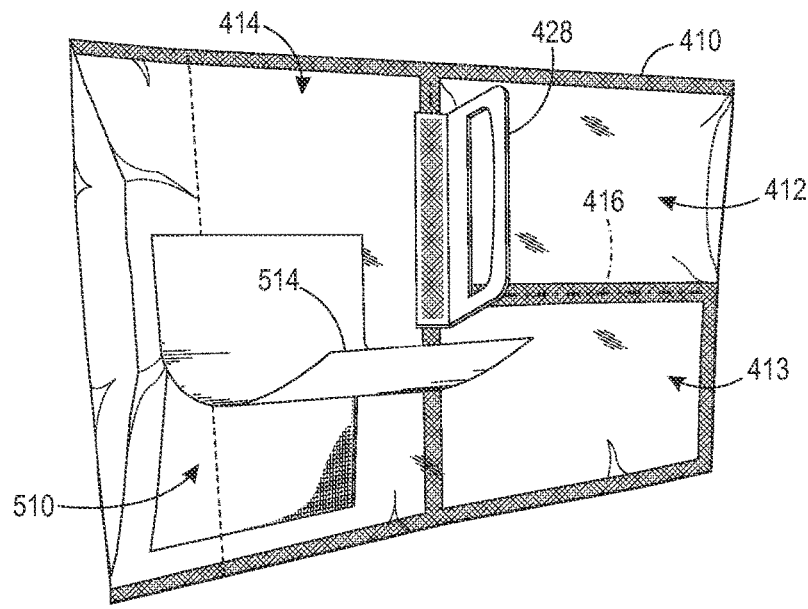
FIGS. 34-37 are illustrations of various alternative embodiments that provide a vapor-permeable surface or membrane in the disclosed container embodiments.
Figure 35:
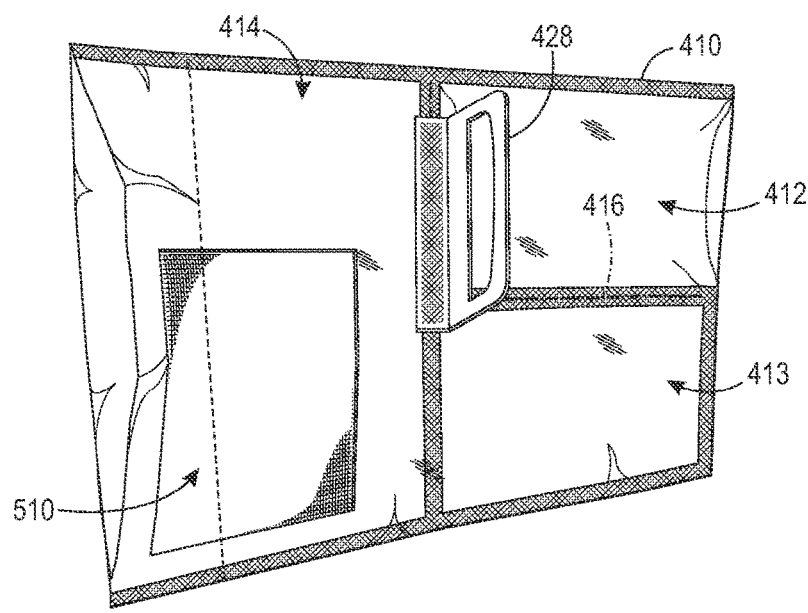

In FIG. 34, two compartments or inner packets, 412 and 413, are illustrated, where each may contain a reagent as discussed in more detail below. The compartments are separated by a frangible or other separable seal, and permit the application of a tension force to the exterior of the container to open the respective compartment so as to cause the admixing of the reagents within a region or compartment 414 of the container. Region 414 also includes at least a portion thereof that is formed of a material 510, as described above, that permits a gas created by the reaction of the reagents to pass through the material into the surrounding environment. As depicted in FIG. 35, material 510 is exposed to air, and as illustrated in FIG. 34, the material region may include a covering layer 514, that can itself be releasably peeled back to expose the ventable material 510.

Figure 36:
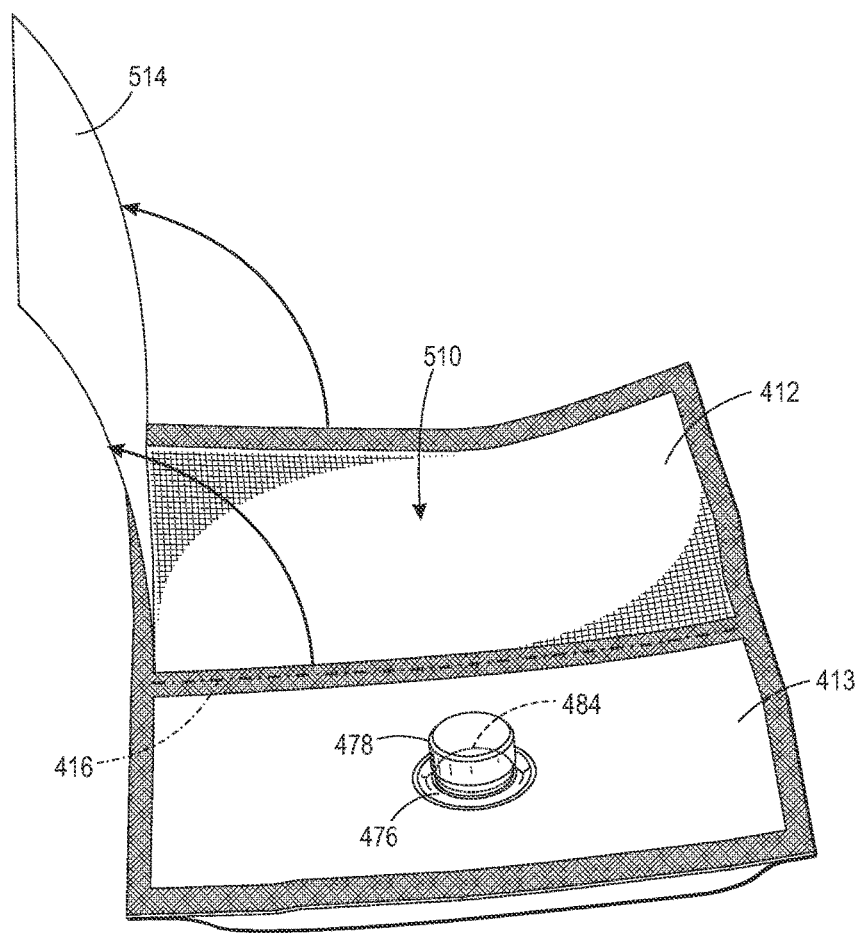

In the alternative embodiment of FIG. 36, the compartments 412 and 413 are separate, and reagents stored therein, are maintained in separate compartment until a seal 416 between them is broken and panel 514 is raised. Mixing of the reagents produces a gas, which is again vented through material 510. In the alternative embodiment illustrated in the lower portion of FIG. 36, the conventional fitment provides an opening for gas to escape via a gas-permeable membrane 484 therein.

Referring briefly to FIG. 37, the depicted embodiment provides a plurality of compartments (412, 413 and 414), separated by frangible seals that may be opened by pulling on the handles 428. Moreover, compartment 414 may include a permeable surface 510 in order to allow gas or vapor to escape through the layer. Also contemplated, and represented as a line 566, is a resealable mechanical seal, such as a resealable "zipper" is well-known for conventional plastic bags. The use of such a seal may permit the compartment (414) to be "resealed" once the contents have been transferred thereto so that the contents remain within the resealed compartment.

Also contemplated herein is the combination of the features described above to provide a container as illustrated, for example, in FIG. 27, where the container includes both a compartment that has a frangible seal as well as an inner packet having a handle 214 and associated tether 204 where a seal is peeled away from packet 102. A multi-compartment, container of this nature would include: a first compartment 412 suitable for receiving a material therein prior to being completely sealed; a second compartment 414 suitable for receiving a material therein, wherein at least a portion of the second compartment is adjacent the first compartment, wherein an adjacent portion of the container between the first and second compartments includes a separable seal 416 to prevent intermixing between the first and second compartments; a third compartment or packet 102, substantially enclosed within at least one of the first compartment or second compartment, where the third compartment is operatively connected to an anchor point (e.g., handle 214) on the container, and wherein a force applied to the handle causes the opening of the third compartment; and optionally external tabs, operatively associated with the container, for applying an opposing force to the seal and separating the seal between the first and second compartment.

Methods of Manufacturing Multi-Compartment Containers

Returning now to FIGS. 8A-8D, depicted therein is an illustration of various operations that may be associated with the preparation of a pre-made packet as may be employed in the embodiments described above. Producing gusseted stand-up pouches with an internal, tearable packet designed for mixing with the main pouch contents requires three main components. First, the internal packet is formed in several steps (see reference numerals 810, 820, 830, 840, 850 and 860). It should be noted that the packet material must be thermally symmetrical, or a mono-layer material, as both sides of the material must be able to seal to each other as well as the sealant layer of the gusset and main pouch body. This material is unwound and processed through a dancer so that it can be intermittently indexed to the desired length of the packet.

Figure 8A:
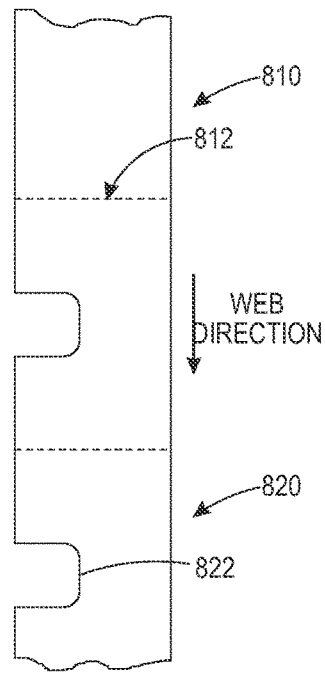
FIGS. 8A-8D are illustrative examples of operations in accordance with one pouch manufacturing method.
Figure 8C:
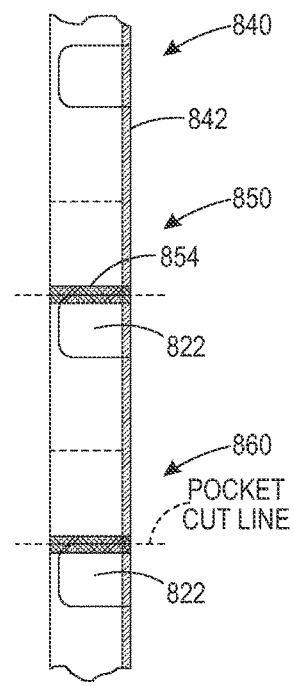
Figure 8B:
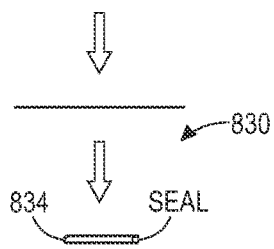
Figure 8D:
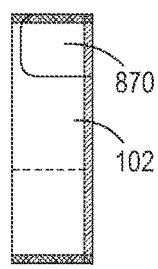

The first intermittent process 810 scores the material along score line 812. This score line will be split or torn by the end user at the time of mixing. Next, at operation 820, the flat web is punched in order to produce an opening 822 through which the packet contents can be filled. For operation 830 (FIG. 8B), the packet web is folded along 834 back on itself in preparation for edge sealing. At 840 (FIG. 8C), the unfolded edge 842 of the folded packet is sealed to create a continuous "tube" with openings at regular intervals for filling. Next, the packets are created at operation 850 in the tube by end sealing at 854 across one edge of the punched opening (822). Finally, at operation 860 the finished packets are cut along edge seal 854 (cut line 862) from the tube of material, to produce a finished packet as depicted in FIG. 8D, where the packet 102 includes an opening 870 for filing.

While the pocket is being formed, the specialized gusset with built-in tab is created in four main steps as represented by the drawings of FIGS. 9A-9E, although it will be appreciated that alternative method may be employed. Referring to those drawings, it is not required that the gusset material be thermally symmetrical or mono-layer like the packet. If the gusset material is a typical lamination with the thermally supportive layer on the outside of the material, the gusset must be punched to create an area where the front and back panels of the gusset can be tacked together. This allows the finished product to stand up.

Figure 9A:
FIGS. 9A-9E are further illustrative examples in accordance with a gusset and pouch manufacturing method.
Figure 9B:
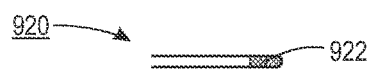
Figure 9C:
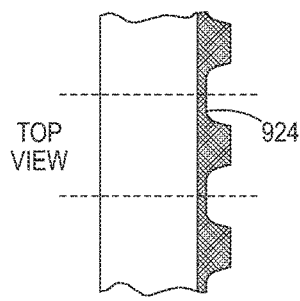
Figure 9D:
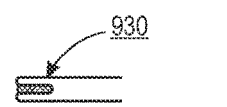
Figure 9E:
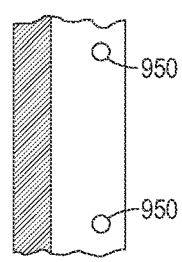

Beginning with operation 910 in FIG. 9A, the gusset material is unwound and processed through a dancer so that it can be intermittently indexed to the width of the finished pouch. The first step (910) in pouch forming is folding the gusset material in half at 912. Second, at FIG. 9B (operation 920) the folded end of the material is sealed along 922 to create the gusset pull tab. At this point the sealed tab can be punched in order to create a pull tab that is not full pouch width (e.g., FIG. 9C, punched region 924). The next step, 930, is to fold the material back onto itself in preparation for insertion into the main pouch. If the gusset material is not thermally symmetrical or mono-layer, it is possible to add gusset tack punches 950 at this point.

Figure 10:
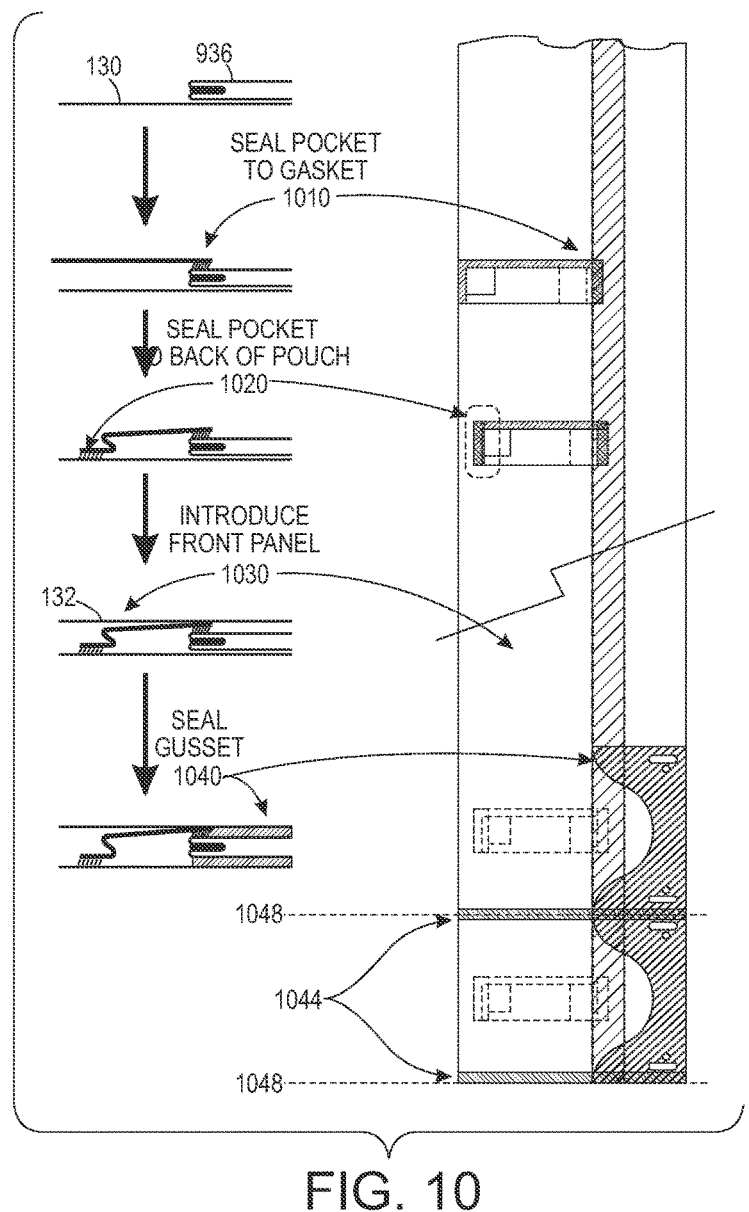
FIG. 10 is a representation of the combination of the manufactured components.

Finally, as represented by the various operations of FIG. 10, the packet and gusset must be inserted and attached to the main pouch in four steps. First, at 1010, the end of the packet opposite the opening (1014) is sealed to the tip of the gusset. Second, the opening end of the packet is sealed to the back panel of the main pouch (optionally it is later sealed with the top of the main pouch along edge 107 as described above). It is important to note that the opening end of the pocket should be sealed below the area where the final main pouch top seal will be made, and there must be some accumulated pocket material between the point where it is sealed to the gusset, and the point where it is sealed to the back panel. This accumulated pocket material will allow the main pouch to be filled without fracturing the packet score line. As seen at 1030, the front panel of the main pouch 132 is introduced over the sealed packet. At 1040, the gusset area is sealed to both front and back panels of the pouch. At this point, the side or cross seals 1044 can be added and the pouches cut-off along lines 1048 at the end of the machine.

Figure 11A:
FIGS. 11A-11D are illustrative examples of the disclosed pouch in a forming-filing-sealing manufacturing method in accordance with an embodiment.
Figure 11B:
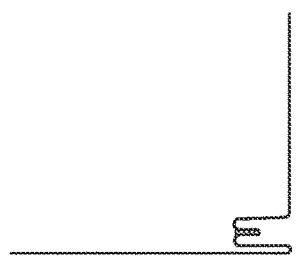
Figure 11C:
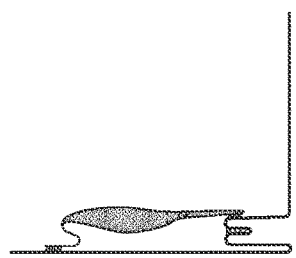
Figure 11D:
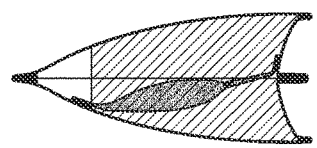

The manufacturing/assembly operation depicted in FIGS. 11A-11D, illustrate alternative operations to accomplish the insertion of a packet within an outer, gusseted-bottom pouch. In the first step depicted in FIG. 11A, the pull tab region of the gusseted pouch is created by sealing along at least a portion of a fold in the pouch material. Next, at FIG. 11B, the gusseted region of the pouch is formed by folding the tab end of the pouch, keeping the pouch front opened (vertical), so that the packet formed in FIGS. 8A-E can be inserted as depicted in FIG. 11C. The packet 102 is placed on the folded gusset and sealed in the region of the tab 118, thereby assuring that pulling on the tab portion of the gusseted bottom will apply a tensile force to the packet. Next, as represented by FIG. 11D, the front side of the pouch is folded over and the sides are sealed to form the pouch. Although depicted with a filled inner pouch being attached in FIG. 11C, also contemplated is filling and sealing of the pouch and packet in a generally concurrent process. In such an operation it may be that the top edges of the pouch and packet are concurrently sealed by a common sealing operation that results in them being sealed and along the same line.

While it will be appreciated that there may be many methods or techniques by which to make one or more of the embodiments described above, the following are exemplary descriptions of such methods.

A first method of preparing a multi-compartment container, comprises: (i) preparing an outer flexible pouch for the receipt of a first material therein; (ii) preparing an inner packet, impervious to the first material in the outer pouch, the inner packet being suitable for receiving at least a second material therein and said inner packet being located within said outer flexible pouch and having a sealable opening therein; and (iii) providing a removable seal and associated link between a surface of the inner packet and a surface of the outer pouch, the removable seal sealing the opening of the inner packet.

As will be appreciated, the seal or link prevents mixing of the first material and the second material unless or until the seal is removed from the opening of the inner packet. In one method, the container may be completed except for a common edge where the compartments remain open, and where the common edge is sealed after the respective materials are inserted into the compartments. Alternatively, the inner packet may be pre-assembled, including placing the second material therein, before locating the inner packet in the outer pouch. Also contemplated is a further modification to the process above, where a handle or tab is created and operatively attached to the outer flexible pouch, where the handle or tab may be employed, in use of the container for applying force to the removable seal by pulling on the handle or tab.

Another method of preparing a multi-compartment container, such as that depicted in FIGS. 23-37, includes: (i) orienting at least a top and a bottom layer of flexible material in a coplanar fashion; (ii) adhering the top and bottom layers to one another to create a first compartment suitable for receiving a material therein prior to being completely sealed; (iii) adhering the top and bottom layers to one another to create a second compartment suitable for receiving a material therein, wherein at least a portion of the second compartment is adjacent to a portion of the first compartment and where the adjacent portion includes a continuous, yet separable (or peelable, frangible, partable), seal between the adjacent portions of the compartments; and (iv) providing external handles, operatively associated with at least the outer surfaces of the top and bottom layers, where the handle is suitable for carrying the container as well as applying a sufficient opposing force to at least a region of the separable seal to separate the seal along the adjacent portions of the first and second compartments. Moreover, as noted above the flexible material employed in the process may be pervious or impervious to gases and liquids.

Figure 38:
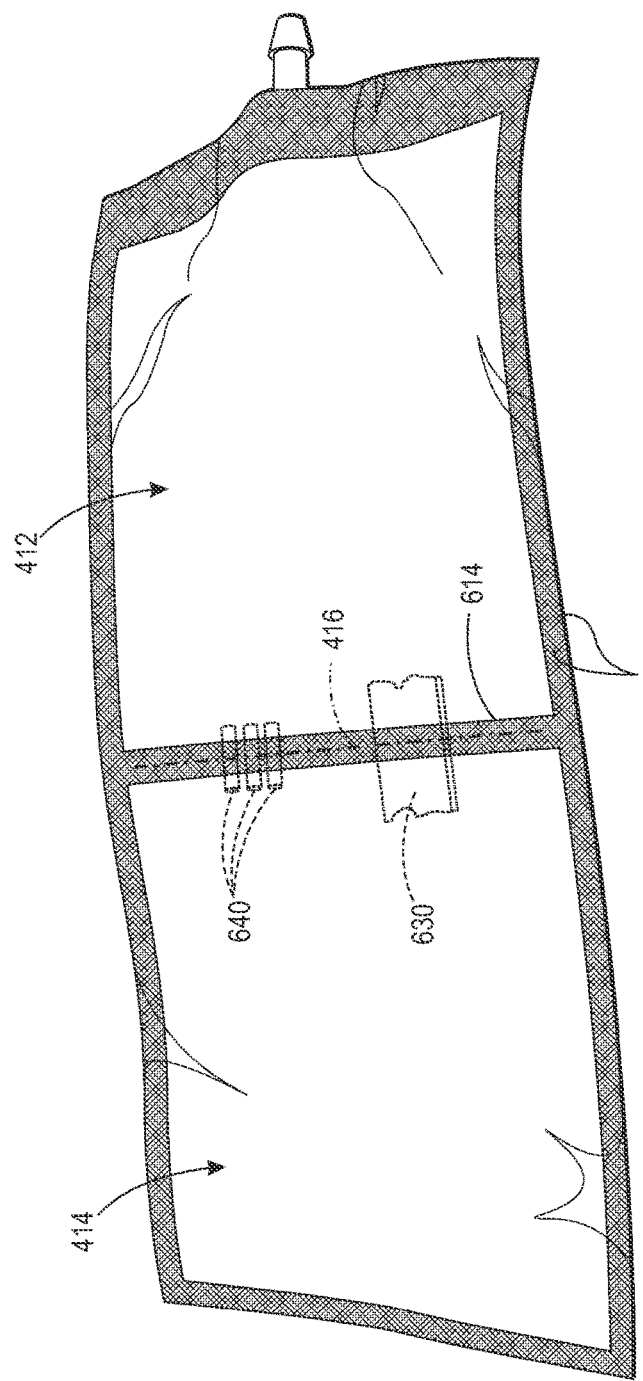
FIG. 38 is an illustration of an alternative seal with components that may permit the seal to be breached or ruptured by the addition of a liquid.

In another alternative embodiment as illustrated, for example in FIG. 38, the seal 614, particularly in the region of line 416, may include an additional element such as film(s) 630, fibers 640 or similar elements that are water or liquid soluble, and are introduced during the manufacturing of the package or the film or plastic materials used to produce the film. More specifically, in the double layered embodiment illustrated, the layers 610 are sealed together using any of the conventional techniques known, but in forming the seal 614, there is a third layer or material (630 or 640) spanning between compartments 412 and 414 over at least a portion of the seal between layers 610. Thus, when the package is later placed in use and a liquid is introduced into one of the compartments, the third material is dissolved and the seal is broken—allowing the contents of compartments 412 and 414 to mix. One example of a water soluble film that may be employed is a product referred to as MonoSol® available from MonoSol LLC, a Kuraray Company. For example, one process contemplates the water soluble material being applied continuously or intermittently along the inner surface of one or both layers 610 in the region of the seal 614, such that when the layers are sealed together, the soluble layer is present in at least a portion of the seal 614.

Moreover, in order to produce a container in accordance with the embodiments depicted in FIG. 30, for example, the external handles 428 must be applied in a size and/or location so as to assure that they extend beyond at least one edge of the container, particularly when grasped together when the container is full, to provide a carrying handle. It will be appreciated that the method disclosed above may have compartments of various sizes and shapes, and in at least one embodiment, the first compartment is formed within the confines of the second compartment, such that the container encompasses the second compartment within the first compartment after the seal between the compartments has been separated. And, for applications where the container must be of a reduced size, yet expandable, the design of the container, and the manufacture thereof, may further include providing the container with at least one pleat along a surface or edge.

The method described above may be further modified to include installing at least one fitment or aperture for both filling and removing the contents of at least one of the compartments. Moreover, the installed fitment may have a resealable aperture.

Figure 40:
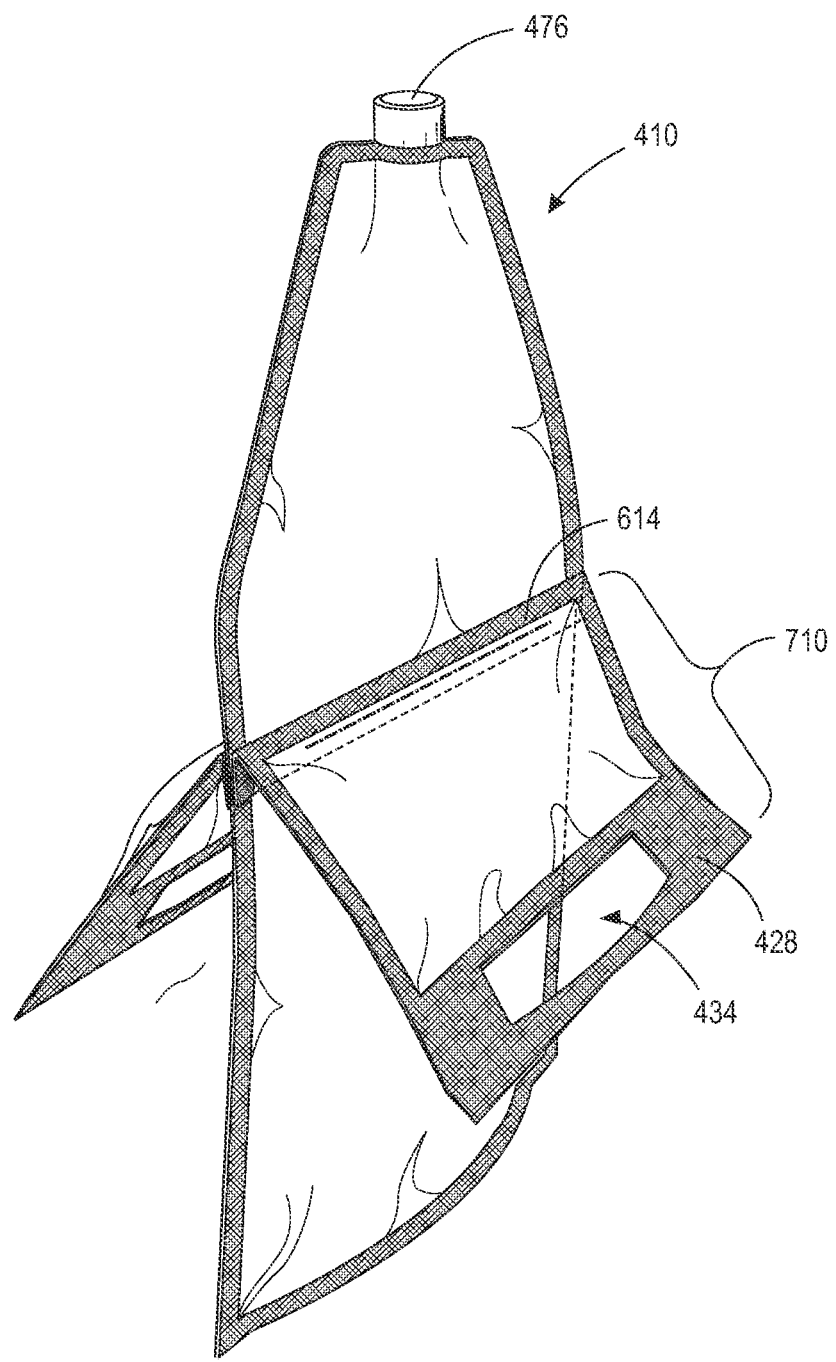
FIGS. 40 and 41 are alternative embodiments of a container with folded lobes provided mid-package.
Figure 41:
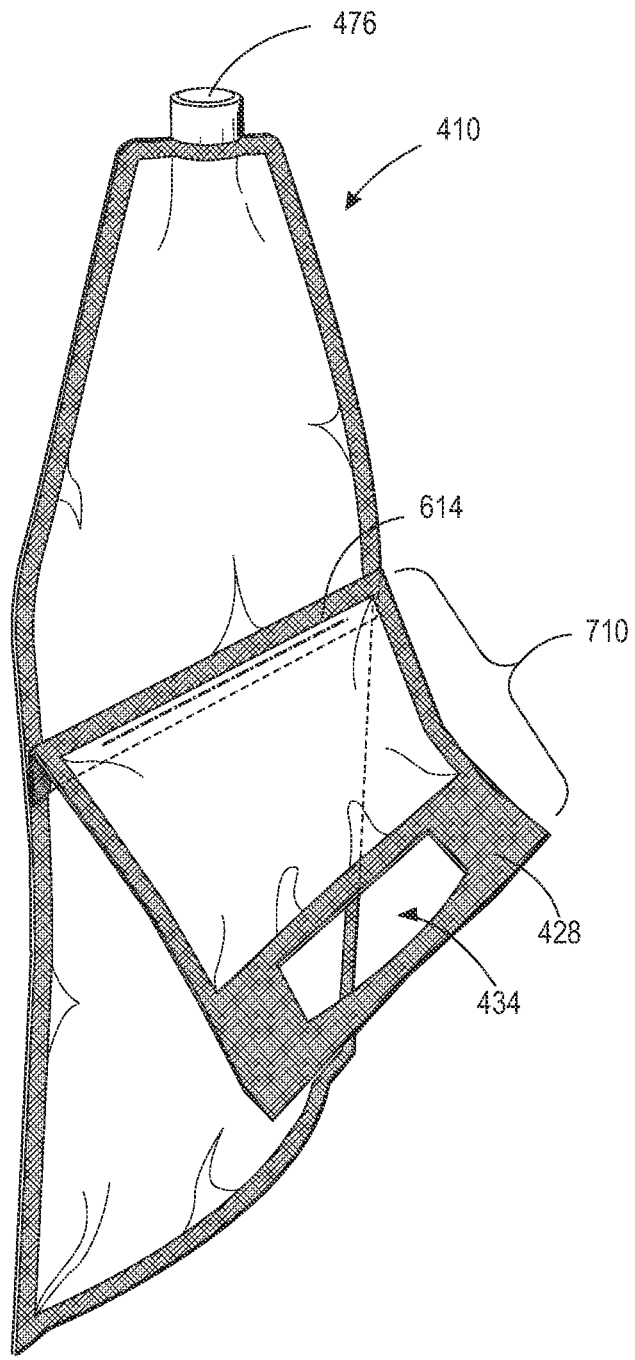

Turning now to FIGS. 40 and 41, depicted therein are further alternative embodiments of a container with folded lobes provided midway along the surface of the package. In the depicted embodiments, one (FIG. 41) or both (FIG. 40) side surfaces of the two-layer container 410 would include lobes formed in the region 710 by folding the respective layer used to make the container back on itself. In this manner, not unlike the expandable embodiment described relative to FIGS. 4A-4B, the container may be produced with the lobes including a die-cut region 434 so as to provide a handle 428. However, handle 428 is further capable of storing a material therein and then being sealed in the region of a seal 614, so as to prevent the materials stored in the packaging from intermixing until the handles 428 are pulled and the seals separated or ruptured. It will be appreciated that in one embodiment, the lobe region 710 may be provided on both sides of the container (FIG. 40), whereas it is also possible to include it on only one side of the container as depicted in FIG. 41.

Also referring to FIG. 42, in a similar manner a gusset or separated wings may be provided along an edge of the container. As illustrated in the figure, in the edge or end region 710, the film layer(s) are again folded onto themselves to form a lobe or compartment. In the illustration, the lobes are also connected or sealed along the sides so as to provide a gusset, but it is contemplated that there may be no connection between the separate lobes in region 710. Moreover, both of the lobes may also include a cut-out region 434 so as to once again provide handles 428 for ease of carrying the container, as well as for applying the force necessary to rupture or open the seal along line 416, and thereby release materials that may be stored in the lobes/handles for mixing with material added to the balance or larger region of container 410. The form, shape and size of the lobes, gussets, wings described and depicted in FIGS. 40-42 may be varied and provided in accordance with the particular application or use desired, and it is presently contemplated that such features may extend the entire width of package or only a portion thereof.

Applications for Use

The following description is intended, among other things, as a description of various exemplary uses and applications of the flexible containers and methods disclosed herein. This description is not intended to be exhaustive, and it will be understood that the disclosed container embodiments may be suitable for additional and alternative uses not specifically described. Moreover, the disclosed embodiments contemplate both a container for prepackaging all components as well as where one or more components may be added at or before the time of mixing or use. The disclosed container may be employed in various beverage applications and the packets and compartments (e.g., 102, 206, 412) may contain a liquid, granular or pulverulent material such as vitamins, protein, flavoring, sweeteners, or any other enhancing ingredients that, due to hydrolysis, oxidation or similar decomposition, potentially shorten the shelf life of the admixture.

Figure 12:
FIGS. 12 and 13 are illustrative examples of pouches with respective food or beverages therein.
Figure 13:
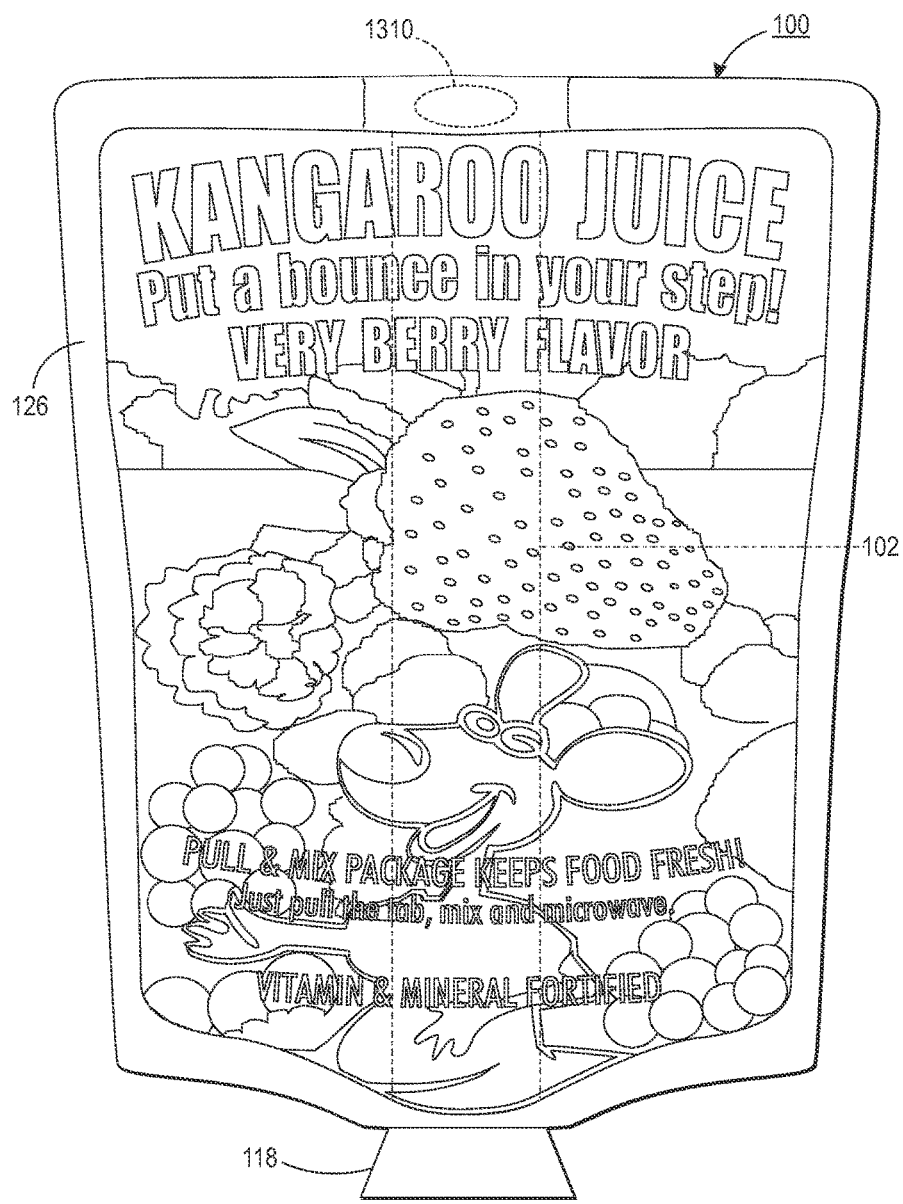

Considering FIGS. 12 and 13, for example, depicted therein are embodiments of the multi-compartment container or package 100, each having a different application and consumable product therein. In the case of FIG. 12, the outer pouch 126 includes vegetables or other ready-to cook/heat foodstuffs, and the inner packet includes a seasoning mix, margarine, dressing, etc. that is preferably applied to the foodstuffs, immediately before or after cooking/heating. As described above, one way of using the container is a user pulling on the top of the outer pouch at position 1210 and at tab 118; which will cause the opening of the inner packet 102, thereby releasing the seasoning or other material to be applied to the foodstuff in pouch 126.

Referring to FIG. 13, outer pouch 126 may include a beverage or other liquid, and the inner packet includes an additive, flavoring, etc. that is preferably mixed with the material in the outer pouch immediately prior to consumption. As described previously, container 100 may be used by squeezing the pouch, or pulling on the top of the outer pouch at position 1310 and at tab 118, to cause the inner packet 102 to be opened relative to the outer pouch 126, thereby releasing the material contained in the packet to be mixed with the material in the pouch before being consumed or used.

One method of using the multi-compartment container described above includes applying a force to a surface of the outer pouch, where the link or packet is attached, to create a tensile force along at least a portion of the surface (130, 132) of the inner packet, the tensile force, of course, being of sufficient magnitude to cause the tearing of the inner packet surface and thereby resulting in the release of the second material to combine with the first material of the outer pouch. Thus, in a simple form, the first compartment of the container includes a first material, and the second compartment includes a second material that is different than the first material. In addition to the beverage and foodstuff example presented, the following are also contemplated.

In a method for creating a cleaning or disinfecting solution, the first compartment is pre-packaged with chlorine (e.g., powder or liquid); the second compartment may include water or may be suitable for the introduction of water prior to mixing. When the container materials are to be mixed and used, the first compartment is opened to expose the chlorine to the water, the solution is mixed and subsequently the mixture of chlorine and water may be dispensed. A similar embodiment may be employed for the mixing of fuel for two-cycle engines, where a prepackaged container includes 2-cycle oil. When needed for use, a user may introduce gasoline in a small quantity into the outer pouch, cause the opening of the oil compartment and mixing of the oil and gas before the contents is then dispensed into the two-cycle device for use. In this manner smaller portions of the fuel mixture may be used so as to avoid having to mix one or more gallons that are subject to spoilage or require a further stabilizer for long-term storage.

Another possible application is contemplated for the containers depicted in FIGS. 34-37. This application contemplates the use of two or more reagents, each stored in separate compartments or inner packets, and the release and mixing of the reagents to form a desired product. Once mixed, the reagents produce a gas or alternative phase material(s) that can be provided for exposure to the environment via a venting element of the container. More specifically, one or more of the layers 510 of material used to make the container 410 may be formed of a gas or vapor permeable or even a fluid permeable material or vent, wherein at least gas or gaseous matter may be exchanged through the material. The admixture of components such as reagents, which are initially stored within vapor and/or liquid impermeable compartments of the container, causes the creation of a desired gas, where the gas is released via the vapor permeable package surface 510 (or fitment) so that the gas may produce a desirable affect to the environment (e.g., disinfectant, sanitization, etc.). Uses contemplated for such an embodiment include the cleaning and disinfection of sporting equipment such as helmets, pads, etc., military equipment that may be shared amongst users, or other apparel or equipment that may have the ability to transmit germs (e.g., meningitis B) from one user to another. In such an application, the packaged materials would be mixed by breaking the seals between separate compartments, causing the reagents to mix and generate a gas, and the package would be left in a sealed room or location with the equipment or items to be sanitized so that the gas exits the permeable membrane or surface and sanitizes the items in contact with the gas. An example of the materials used for such a process can be found in U.S. Pat. Nos. 5,853,689 and 6,174,508 to F. Klatte, which are hereby incorporated by reference in their entirety, and a product referred to as Z-Series™ Coil Cleaner from ICA TriNova, LLC.

Other applications include the packaging of materials for biohazard neutralization/inactivation; testing materials/reagents; agricultural materials, pharmaceutical materials, etc. Further applications include the use of gaseous components including nitrogen additives, and oxygen scavenging materials. In laboratory applications, the disclosed embodiments contemplate that the mixed components can also be sent through another test or device to analyze or determine certain characteristics (e.g., PCR—polimerase chain reaction, etc.).

The disclosed containers are contemplated for a range of uses spanning commercial, industrial, consumer uses and the sizes that may be employed include macro, micro, nano or other sizes that are dependent upon at least scale, scope and purpose.

As noted herein, the materials that may be packaged within, for example, the outer pouch 126 and inner packet 102, include various materials, and in several exemplary embodiments foods or beverages specifically. For example, chemical (separate reactants until use), medical, industrial and military applications (e.g., MREs), the separation of resins for adhesives such as an epoxy mixture, etc. In other words, some usage may not be for consumption, but separation may be necessary prior to mixture and use of the materials in the pouch. The pouch systems may also be used for pre-portioning of ingredients prior to use. As indicated above, however, the possible uses of the disclosed embodiments are not limited to a package for food or beverages, and may be applied to any of a number of other materials that should be maintained in separate packaging compartments until the time of use. In other words, a multi-compartment container in accordance with the features disclosed herein may be used for the separate storage of ingredients or materials for a variety of products, where at least two ingredients can be stored separately for long periods of time, and when the inner packet(s) is torn, the materials are combined to produce a desired mixture. The materials must generally be maintained in separation until shortly before use to avoid a propensity to degrade in quality over a period of time.

It may also be possible to accomplish one or more chemical reactions as a result of the opening of a compartment and exposure of materials (solid, liquid or gas therein. In such a situation it is also contemplated that the container may become pressurized for at least a period of time, and that as a result of the pressurization, the container itself changes so as to expand and/or become rigid.

One application contemplated is the pre-packaging and storage of a material that can later be mixed with water or other materials that can be produced in a military environment. For example, the container may include a filter into the spout allowing the container to be shipped or stored "empty" (perhaps with one inner compartment having a material therein) for medical/military use. When needed, the outer compartment is filled (e.g., with saline solution, sterile water, etc.), the inner compartment is opened and then the requisite pharmaceutical is made available. Thus, the container permits the shipment and storage of materials in an "empty" or full configuration which may further save costs for transportation and storage of such materials. A similar example is the use of the container for a cleaning or disinfecting product, where a powdered chemical (e.g., chlorine) is stored in the sealed compartment or packet and the outer compartment is empty allowing the consumer to fill and mix the material at home when needed.

Generally, the disclosed embodiments and various application examples characterize a method for use of a multi-compartment container, container comprising an outer flexible pouch having a first material therein (initially or after filling prior to use) along with an inner packet having a second material stored within the inner packet, where the inner packet includes a sealable opening, and a link between a surface of the inner packet and a surface of the outer pouch, where the method of use includes: (i) placing a first material in the outer flexible pouch; (ii) storing a second material in the inner packet; and (iii) applying a force to a surface of the outer pouch to create a tensile force to cause open the inner packet to the outer pouch and to expose the opening therein and enabling a combination of the second material with the first material, the combination being retained within the outer pouch.

As noted herein the outer pouch may include a resealable aperture or fitment. And, the method of use further contemplates applying force to open the inner packet by pulling at least one handle operatively affixed to the container.

Accordingly, the disclosed embodiments provide a pouch filled with a first material and a frangible or severable internal packet, filled with another substance to be mixed with the second material, whereby the application of an external force is conveyed from outside the pouch to the packet via a link, tab or similar member to expose the second material of the inner packet.

Other Modifications & Features

It will be further appreciated that the fitment, port or spout may include one or more features. Various fitment examples are presented in the description above and the associated figures. However, it will be further appreciated that the particular fitment may be specific for the application that is intended, and that fitments that allow control of access, resealing, etc. may be employed. Moreover, those that are designed to interface with a particular device may be customized in order to permit the container to provide or interact with the desired interface. The fitments contemplated include those for delivering liquid and/or paste/powder mixtures.

Filters may be included in or associated with the fitments or ports. The term filter is intended to be broadly characterized and includes screens and the like of varying materials, coarseness/fineness, etc. Moreover, the filters may be used to process both the mixture being dispensed as well as incoming materials in the case where the outer pouch is shipped "dry". One possibility is that the filter is a microbial filter used to pre-filter liquid (e.g., water) introduced into the pouch or compartment, and the inner packet then further includes an additional treatment (e.g., chlorine, iodine, etc.) for the pre-filtered liquid. As an output filter, the fitment may include a screen or similar mechanism to assure that no particulate (e.g., undissolved granules from the packet) are allowed to exit the container. The filter or fitment may similarly provide valves (e.g., check valves, two-way valves, or a safety valve requiring a further manual interaction in order to release the mixed contents of the container), flow controls as well as other features or characteristics. One characteristic contemplated is a foaming barrier, so that in the event that a foam is created by a reaction of materials being mixed, the barrier prevents the foam from being dispensed or accidentally splashed when the fitment is opened.

Another feature contemplated and disclosed herein is a vent or similar opening in one or more compartments of the disclosed container to assure that the material may be drained or removed from the container and not held in the pouch or compartment due to a vacuum being created. As such, any of a number of vents, including a puncture or similar hole, of one-way valves may be employed to permit the entrance of air or a similar "make-up" medium as the balance of the material in the container is removed. Another use of a vent of similar structure would be in embodiments where the contents expands due to a chemical reaction or heating of the container, and where it may be necessary to include the capability of venting in order to avoid the premature release of material via a fitment or other point of access. For example, in a heated container (e.g., microwavable, boilable) it may be advantageous to include a vent in one or more compartments in order to neutralize pressure so that the container does not burst or pop.

Also contemplated is the use of a fitment that is in the form of, or may be attached to, a spray mechanism such as a spray bottle top as is well-known. In such an application, the cleaning materials may be present or inserted into the various compartments, the spray handle attached to a fitment, and the compartments then opened to permit mixing of a cleaning or other sprayable solution. Also contemplated is the addition of a powered "pump" to fill or empty the pouch.

In yet another application, access to the mixed materials may be accomplished via tearing or opening the outer pouch. In such an application, the outer pouch may also be provided with micro-tears, micro-perforations or some sort of scoring (laser score) in order to enable opening of the outer compartment(s).

Various additional features may be included with or incorporated into the container, and such features may include seals and surfaces for securing, opening, closing, resealing, hanging, carrying, storing and transporting the container. Other features such as zippers, snaps, buttons, zip-Lock™ type closure, hook & loop fasteners, clasps, etc. may also be included. Furthermore, the container may include a surface or a sheet of material operatively attached to the container, where the sheet is removable, or where the sheet or other surface includes a surface suitable for receiving markings from a writing instrument.

While the various embodiments have been described with respect to a pouch which is essentially rectangular in shape, it is to be understood that it is applicable to pouches of other shapes and sizes, such as a triangular or trapezoidal perimeter possibly having curved corners.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A multi-compartment, flexible container, comprising:
a first compartment, said first compartment being suitable for receiving a first granular material therein;
a second compartment, said second compartment being suitable for receiving a second granular material therein, wherein a border of the second compartment is adjacent the first compartment and where the first compartment and the second compartment are formed between flexible film layers;

a frangible, non-resealable seal separating the first and second compartments to initially prevent opening between the first and second compartments, said frangible seal being the result of the adhesion of the flexible film layers, wherein said frangible seal includes a V-shaped stress concentrating feature facilitating an initial separation of said frangible seal; and at least one external tab, operatively associated with an external surface of one of said flexible film layers, said tab positioned at a tip of said V-shaped stress concentrating feature to externally apply a tensile force to the stress concentrating feature of the frangible seal for separating the frangible seal, wherein at least one of said first or second compartments includes a vapor permeable region where gas escapes the package through the vapor permeable region.

2. The flexible container according to claim 1, wherein said vapor permeable region includes a surface having perforations therein.

3. The flexible container according to claim 2, wherein said perforations are micro-perforations of a size suitable to permit gas to freely pass through the micro-perforations while resisting the passage of granular materials therethrough.

4. The flexible container according to claim 1, wherein said vapor permeable region includes a surface constructed from a vapor permeable material.

5. The flexible container according to claim 4, wherein said vapor permeable material includes a non-woven material.

6. The flexible container according to claim 5, wherein said vapor permeable region further includes a removable, non-permeable cover.

7. The flexible container according to claim 1, further including a flexible cover for covering at least said vapor permeable region.

8. The flexible container according to claim 7, wherein said cover comprises a non-permeable material.

9. The flexible container according to claim 1, including layers of material used to assemble the container, at least one of said layers being formed of a permeable material in said vapor permeable region.

10. The flexible container according to claim 9, wherein at least a gas may be exchanged through the permeable material.

11. The flexible container according to claim 10, wherein said permeable material is selected from the group consisting of: a polypropylene, polyethylene, non-woven materials, and flashspun high-density polyethylene fibers.

12. The flexible container according to claim 10, wherein said permeable material includes micro-perforations to at least the permeable region, where said micro-perforations are of a size suitable to permit gas to pass through the micro-perforations while preventing solid material from passing therethrough.

13. The flexible container according to claim 1, wherein the vapor permeable region, in association with opening of said separable seal, permits the admixture of materials in the first and second compartment to produce a reaction between the materials, and where a byproduct created by the reaction is passed through the permeable region to an environment in which the package is deployed.

14. The flexible container according to claim 1, wherein said stress concentrating feature of the frangible seal includes an edge extending outward beyond a remainder of said frangible seal.

15. A multi-compartment, flexible container, comprising:
a first compartment suitable for receiving a first material therein;
a second compartment suitable for receiving a second material therein, wherein a border of the second compartment is adjacent the first compartment and where the first compartment and the second compartment are formed between flexible film layers;
a frangible, non-resealable seal separating the first and second compartments to initially prevent opening between the first and second compartments, said frangible seal being the result of the adhesion of the flexible film layers, wherein said frangible seal includes a V-shaped stress concentrating feature; and
at least one external tab, operatively associated with the container, said tab positioned at a tip of the V-shaped stress concentrating feature of the frangible seal for separating the frangible seal,
wherein at least one of said first or second compartments includes a vapor permeable region in the form of a fitment, said fitment having a gas permeable membrane therein, and where gas is directly exchanged through the gas permeable membrane and thereby escapes the package.

16. The flexible container according to claim 15, further including a resealable cap to cover said fitment.

17. The flexible container according to claim 16, wherein said cap further includes a pressure release.

18. The flexible container according to claim 17, wherein said pressure release is accomplished by the cap opening under pressure.

19. The flexible container according to claim 17, wherein said pressure release occurs at a pressure less than a rupture pressure of the container.

20. A multi-compartment, flexible container, comprising:
a first compartment suitable for receiving a first solid material therein;
a second compartment suitable for receiving a second solid material therein;
said first and second compartments being separated by at least one seal;
a third compartment, adjacent the first compartment and the second compartment, said third compartment of a size suitable for receiving the first and second materials from said first and second compartments, where the third compartment includes a vapor permeable region; and
a frangible, non-resealable seal between the third compartment and both of the first and second compartments to initially prevent opening between the said third compartment and the first compartment or the second compartment, respectively, wherein said frangible seal includes a V-shaped stress concentrating feature;
at least one external tab, operatively associated with the container and applied to an outer surface thereof at a location at a tip of the V-shaped stress concentrating feature of the frangible, non-resealable seal, and wherein said external tab also serves as a handle suitable for carrying the container.

* * * * *